(12) United States Patent
Khoshnevisan et al.

(10) Patent No.: US 12,477,472 B2
(45) Date of Patent: Nov. 18, 2025

(54) POWER BOOSTING FOR UPLINK SHARED CHANNEL REPETITIONS

(71) Applicant: QUALCOMM INCORPORATED, San Diego, CA (US)

(72) Inventors: Mostafa Khoshnevisan, San Diego, CA (US); Yitao Chen, San Diego, CA (US); Xiaoxia Zhang, San Diego, CA (US); Tao Luo, San Diego, CA (US); Fang Yuan, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 546 days.

(21) Appl. No.: 18/000,233

(22) PCT Filed: Jul. 15, 2020

(86) PCT No.: PCT/CN2020/102039
§ 371 (c)(1),
(2) Date: Nov. 29, 2022

(87) PCT Pub. No.: WO2022/011583
PCT Pub. Date: Jan. 20, 2022

(65) Prior Publication Data
US 2023/0354205 A1    Nov. 2, 2023

(51) Int. Cl.
*H04W 52/14*    (2009.01)
*H04W 52/10*    (2009.01)

(52) U.S. Cl.
CPC ........ *H04W 52/146* (2013.01); *H04W 52/10* (2013.01)

(58) Field of Classification Search
CPC .......................... H04W 52/14; H04W 52/10
See application file for complete search history.

(56) References Cited

U.S. PATENT DOCUMENTS

| 9,674,710 B2 | 6/2017 | Chen et al. |
| 11,290,968 B2 * | 3/2022 | MolavianJazi ....... H04L 1/1858 |
| 11,304,203 B2 * | 4/2022 | Yang .................... H04W 28/24 |

(Continued)

FOREIGN PATENT DOCUMENTS

| WO | WO-2005048491 A1 | 5/2005 |
| WO | WO-2011079420 A1 | 7/2011 |
| WO | WO-2015095564    | 6/2015 |

OTHER PUBLICATIONS

International Search Report and Written Opinion—PCT/CN2020/102039—ISA/EPO—Mar. 30, 2021.

(Continued)

*Primary Examiner* — Hai V Nguyen
(74) *Attorney, Agent, or Firm* — Holland & Hart LLP

(57) ABSTRACT

Methods, systems, and devices for wireless communications are described herein for power boosting uplink share channel repetitions. A user equipment (UE) may receive from abase station a control message that schedules a set of transmission occasions for one or more uplink messages for the UE. The UE may determine from the control message the set of transmission occasions to apply power boosting. The UE may determine the transmit power for each transmission occasion based at least in part on the power boost configuration. The UE may transmit one or more uplink messages via the set of transmission occasions with the determined transmit power.

35 Claims, 21 Drawing Sheets

(56) References Cited

U.S. PATENT DOCUMENTS

| | | | | |
|---|---|---|---|---|
| 11,706,788 | B2* | 7/2023 | Yang | H04W 28/24 370/329 |
| 12,035,241 | B2* | 7/2024 | Islam | H04W 72/542 |
| 12,133,180 | B2* | 10/2024 | MolavianJazi | H04W 52/48 |
| 2016/0119820 | A1 | 4/2016 | Chen | |
| 2020/0195404 | A1 | 6/2020 | Lee et al. | |
| 2020/0267659 | A1* | 8/2020 | MolavianJazi | H04W 52/143 |
| 2020/0267667 | A1* | 8/2020 | MolavianJazi | H04W 52/48 |
| 2021/0258969 | A1* | 8/2021 | Yang | H04W 72/54 |
| 2022/0046557 | A1* | 2/2022 | MolavianJazi | H04W 24/10 |
| 2022/0191873 | A1* | 6/2022 | Yang | H04W 28/24 |
| 2023/0388815 | A1* | 11/2023 | Jeon | H04B 17/336 |
| 2024/0224270 | A1* | 7/2024 | Xiong | H04B 7/0626 |
| 2024/0422690 | A1* | 12/2024 | Guo | H04W 52/146 |
| 2024/0422775 | A1* | 12/2024 | Jang | H04L 1/08 |
| 2025/0071820 | A1* | 2/2025 | Xiong | H04L 1/1861 |
| 2025/0150988 | A1* | 5/2025 | Lim | H04L 5/0094 |
| 2025/0220582 | A1* | 7/2025 | Li | H04W 76/27 |

OTHER PUBLICATIONS

Motorola Mobility, et al., "Enhanced Inter UE Tx Prioritization/Multiplexing for URLLC", R1-1911300, 3GPP TSG RAN WG1 #98bis, Chongqing, China, Oct. 14-20, 2019, Oct. 20, 2019) Sections 2.2, 8 Pages.

OPPO: "Inter UE Tx Prioritization and Multiplexing", R1-1910623, 3GPP TSG RAN WG1 #98bis, Chongqing, China, Oct. 14-20, 2019, Oct. 20, 2019 (Oct. 20, 2019) the Whole Document, 10 Pages, XP051808611, pp. 2-3, 2 Remaining issues on UL preemption indicationpages 3-8, 3 Group common DCI design for ULPIpage 8, 4 Power control solution.

Huawei, et al., "UL inter-UE transmission prioritization and multiplexing", 3GPP TSG RAN WG1 Meeting #98bis, R1-1910070, 3rd Generation Partnership Project, Mobile Competence Centre, 650, Route Des Lucioles, F-0692, Sophia-Antipolis Cedex, France, vol. RAN WG1, No. Chongqing, China, Oct. 14, 2019-Oct. 20, 2019, Oct. 8, 2019, XP051788877, 11 Pages, paragraphs [03.1], [3.2.Option3Proposal3], paragraphs [05.1], [6.ProposalsltoS].

Nokia, et al., "UL Inter-UE eMBB and URLLC Multiplexing Enhancements", 3GPP TSG RAN WG1 Meeting #98-Bis, R1-1910868, 3rd Generation Partnership Project, Mobile Competence Centre; 650, Route Des Lucioles; F-06921 Sophia-Antipolis Cedex, France, vol. Ran WG1, No. Chongqing, China, Oct. 14, 2019-Oct. 20, 2019, Oct. 7, 2019, 16 Pages, XP051808982, pp. 2-8, 2 Refinement of uplink cancelation solution, p. 8, line 25-line 40, Section 2.3, paragraph [0003].

Supplementary European Search Report—EP20945250—Search Authority—The Hague—Mar. 15, 2024.

Huawei, et al., "UL inter-UE transmission prioritization and multiplexing", 3GPP TSG RAN WG1 Meeting #98bis, R1-1910070, 3rd Generation Partnership Project, Mobile Competence Centre, 650, Route Des Lucioles, F-0692, Sophia-Antipolis Cedex, France, vol. RAN WG1, No. Chongqing, China, Oct. 14, 2019-Oct. 20, 2019, Oct. 8, 2019, XP051788877, 11 Pages.

* cited by examiner

POWER BOOSTING FOR UPLINK SHARED CHANNEL REPETITIONS

CROSS REFERENCE

The present application is a 371 national stage filing of International PCT Application No. PCT/CN2020/102039 by Khoshnevisan et al. entitled "POWER BOOSTING FOR UPLINK SHARED CHANNEL REPETITIONS," filed Jul. 15, 2020, which is assigned to the assignee hereof, and which is expressly incorporated by reference in its entirety herein.

FIELD OF TECHNOLOGY

The following relates to wireless communications, including power boosting for uplink shared channel repetitions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some examples, a first user equipment (UE) may transmit a physical uplink share channel (PUSCH) by transmitting repetitions of the PUSCH to multiple transmission/reception points (TRPs). In some cases, a PUSCH repetitions from the first UE may experience a collision or interference at a first TRP from a transmission from a second UE. The first UE may determine to increase the transmission power for a PUSCH repetitions based on the priority of the PUSCH to improve reception at the first TRP. In some cases, a second TRP may not experience collision or significant interference from the second UE while receiving PUSCH repetitions from the first UE. In this case, increasing the transmission power for the PUSCH repetitions from the first UE to the second TRP may be unnecessary and may degrade the systems performance by introducing additional interference.

SUMMARY

The described techniques relate to improved methods, systems, devices, and apparatuses that support power boosting for uplink shared channel repetitions. Generally, the described techniques provide for power boosting uplink share channel repetitions. A UE may receive from a base station a control message that schedules a set of transmission occasions for one or more uplink messages for the UE. The UE may determine from the control message the set of transmission occasions to apply power boosting. The UE may determine the transmit power for each transmission occasion based at least in part on the power boost configuration. The UE may transmit one or more uplink messages via the set of transmission occasions with the determined transmit power.

A method of wireless communications at a UE is described. The method may include receiving, from a base station, a control message that schedules a set of transmission occasions for one or more uplink messages for the UE, determining a power boost configuration for the UE, the power boost configuration indicating which of the set of transmission occasions to apply power boosting, determining respective transmit powers for each transmission occasion of the set of transmission occasions based on the power boost configuration, and transmitting the one or more uplink messages via the set of transmission occasions in accordance with the respective transmit powers.

An apparatus for wireless communications at a UE is described. The apparatus may include a processor, memory coupled with the processor, and instructions stored in the memory. The instructions may be executable by the processor to cause the apparatus to receive, from a base station, a control message that schedules a set of transmission occasions for one or more uplink messages for the UE, determine a power boost configuration for the UE, the power boost configuration indicating which of the set of transmission occasions to apply power boosting, determine respective transmit powers for each transmission occasion of the set of transmission occasions based on the power boost configuration, and transmit the one or more uplink messages via the set of transmission occasions in accordance with the respective transmit powers.

Another apparatus for wireless communications at a UE is described. The apparatus may include means for receiving, from a base station, a control message that schedules a set of transmission occasions for one or more uplink messages for the UE, determining a power boost configuration for the UE, the power boost configuration indicating which of the set of transmission occasions to apply power boosting, determining respective transmit powers for each transmission occasion of the set of transmission occasions based on the power boost configuration, and transmitting the one or more uplink messages via the set of transmission occasions in accordance with the respective transmit powers.

A non-transitory computer-readable medium storing code for wireless communications at a UE is described. The code may include instructions executable by a processor to receive, from a base station, a control message that schedules a set of transmission occasions for one or more uplink messages for the UE, determine a power boost configuration for the UE, the power boost configuration indicating which of the set of transmission occasions to apply power boosting, determine respective transmit powers for each transmission occasion of the set of transmission occasions based on the power boost configuration, and transmit the one or more uplink messages via the set of transmission occasions in accordance with the respective transmit powers.

In some examples of the method, apparatuses, and non-transitory computer-readable medium described herein, determining the power boost configuration may include operations, features, means, or instructions for determining the power boost configuration based on the control message, where the control message includes a field that indicates which of the set of transmission occasions to apply power boosting.

Some examples of the method, apparatuses, and non-transitory computer-readable medium described herein may further include operations, features, means, or instructions for determining a first set of uplink power control parameters for the first subset of the set of transmission occasions based on a first parameter field in the control message, and determining a second set of uplink power control parameters for the second subset of the set of transmission occasions based on a second parameter field in the control message.

Some examples of the method, apparatuses, and non-transitory computer-readable medium described herein may further include operations, features, means, or instructions for determining a first set of uplink power control parameters for a first subset of the set of transmission occasions based on a first set of bits of a parameter field in the control message, and determining a second set of uplink power control parameters for a second subset of the set of transmission occasions based on a second set of bits of the parameter field in the control message.

Some examples of the method, apparatuses, and non-transitory computer-readable medium described herein may further include operations, features, means, or instructions for determining a first set of uplink power control parameters for a first subset of the set of transmission occasions based on a first parameter field and a first resource field included in the control message, where the first resource field corresponds to the first subset of the set of transmission occasions.

Some examples of the method, apparatuses, and non-transitory computer-readable medium described herein may further include operations, features, means, or instructions for determining a second set of uplink power control parameters for a second subset of the set of transmission occasions based on a second parameter field and a second resource field included in the control message, where the second resource field corresponds to the second subset of the set of transmission occasions.

Some examples of the method, apparatuses, and non-transitory computer-readable medium described herein may further include operations, features, means, or instructions for receiving a second control message before receiving the control message, where the second control message indicates the presence of the second parameter field.

Some examples of the method, apparatuses, and non-transitory computer-readable medium described herein may further include operations, features, means, or instructions for determining a first open loop power control parameter for a first subset of the set of transmission occasions based on the control message including a joint parameter field and a joint resource field indicating a first value of a pair of values for open loop power control for the first subset of the set of transmission occasions, and determining a second open loop power control parameter for a second subset of the set of transmission occasions based on the control message including the joint parameter field and the joint resource field indicating a second value of the pair of values for open loop power control for the second subset of the set of transmission occasions.

Some examples of the method, apparatuses, and non-transitory computer-readable medium described herein may further include operations, features, means, or instructions for determining a first open loop power control parameter for a first subset of the set of transmission occasions based on a joint parameter field and an absence of a resource field in the control message, and determining a second open loop power control parameter for a second subset of the set of transmission occasions based on the joint parameter field and the absence of the resource field in the control message.

Some examples of the method, apparatuses, and non-transitory computer-readable medium described herein may further include operations, features, means, or instructions for receiving a second control message before receiving the control message, where the second control message includes the power boost configuration indicating which of the set of transmission occasions to apply power boosting.

Some examples of the method, apparatuses, and non-transitory computer-readable medium described herein may further include operations, features, means, or instructions for receiving the second control message via RRC signaling.

Some examples of the method, apparatuses, and non-transitory computer-readable medium described herein may further include operations, features, means, or instructions for determining a first set of uplink power control parameters for a first subset of the set of transmission occasions based on the power boost configuration, determining a second set of uplink power control parameters for a second subset of the set of transmission occasions based on the power boost configuration, transmitting a first uplink message via the first subset of the set of transmission occasions based on the first set of uplink power control parameters, and transmitting a second uplink message via the second subset of the set of transmission occasions based on the second set of uplink power control parameters.

In some examples of the method, apparatuses, and non-transitory computer-readable medium described herein, determining respective transmit powers may include operations, features, means, or instructions for determining a first transmit power for a first subset of the set of transmission occasions based on the power boost configuration, and determining a second transmit power for a second subset of the set of transmission occasions based on the power boost configuration.

Some examples of the method, apparatuses, and non-transitory computer-readable medium described herein may further include operations, features, means, or instructions for determining the first and second transmit powers to be the same based on the power boost configuration indicating both the first and second subsets of the set of transmission occasions for applying power boosting.

A method of wireless communications at a base station is described. The method may include determining a power boost configuration for a UE in communication with the UE, transmitting an indication of the power boost configuration to the UE, where the power boost configuration indicates which of a set of transmission occasions that the UE is to apply power boosting, transmitting a control message that schedules transmission of one or more uplink messages via the set of transmission occasions, and receiving the one or more uplink messages via the set of transmission occasions in accordance with a transmit power based on the power boost configuration.

An apparatus for wireless communications at a base station is described. The apparatus may include a processor, memory coupled with the processor, and instructions stored in the memory. The instructions may be executable by the processor to cause the apparatus to determine a power boost configuration for a UE in communication with the UE, transmit an indication of the power boost configuration to the UE, where the power boost configuration indicates which of a set of transmission occasions that the UE is to apply power boosting, transmit a control message that schedules transmission of one or more uplink messages via the set of transmission occasions, and receive the one or more uplink messages via the set of transmission occasions in accordance with a transmit power based on the power boost configuration.

Another apparatus for wireless communications at a base station is described. The apparatus may include means for determining a power boost configuration for a UE in communication with the UE, transmitting an indication of the power boost configuration to the UE, where the power boost configuration indicates which of a set of transmission occasions that the UE is to apply power boosting, transmitting a control message that schedules transmission of one or more uplink messages via the set of transmission occasions, and receiving the one or more uplink messages via the set of transmission occasions in accordance with a transmit power based on the power boost configuration.

A non-transitory computer-readable medium storing code for wireless communications at a base station is described. The code may include instructions executable by a processor to determine a power boost configuration for a UE in communication with the UE, transmit an indication of the power boost configuration to the UE, where the power boost configuration indicates which of a set of transmission occasions that the UE is to apply power boosting, transmit a control message that schedules transmission of one or more uplink messages via the set of transmission occasions, and receive the one or more uplink messages via the set of transmission occasions in accordance with a transmit power based on the power boost configuration.

In some examples of the method, apparatuses, and non-transitory computer-readable medium described herein, transmitting the indication of the power boost configuration may include operations, features, means, or instructions for including the indication of the power boost configuration in the control message that schedules transmission of one or more uplink messages, where the control message includes DCI.

In some examples of the method, apparatuses, and non-transitory computer-readable medium described herein, transmitting the indication of the power boost configuration may include operations, features, means, or instructions for transmitting, via RRC signaling, a second control message including the indication of the power boost configuration.

Some examples of the method, apparatuses, and non-transitory computer-readable medium described herein may further include operations, features, means, or instructions for transmitting a parameter field and a resource field in the control message, where the parameter field and the resource field indicate which of the set of transmission occasions that the UE may be to apply power boosting.

DETAILED DESCRIPTION

Figure 1:
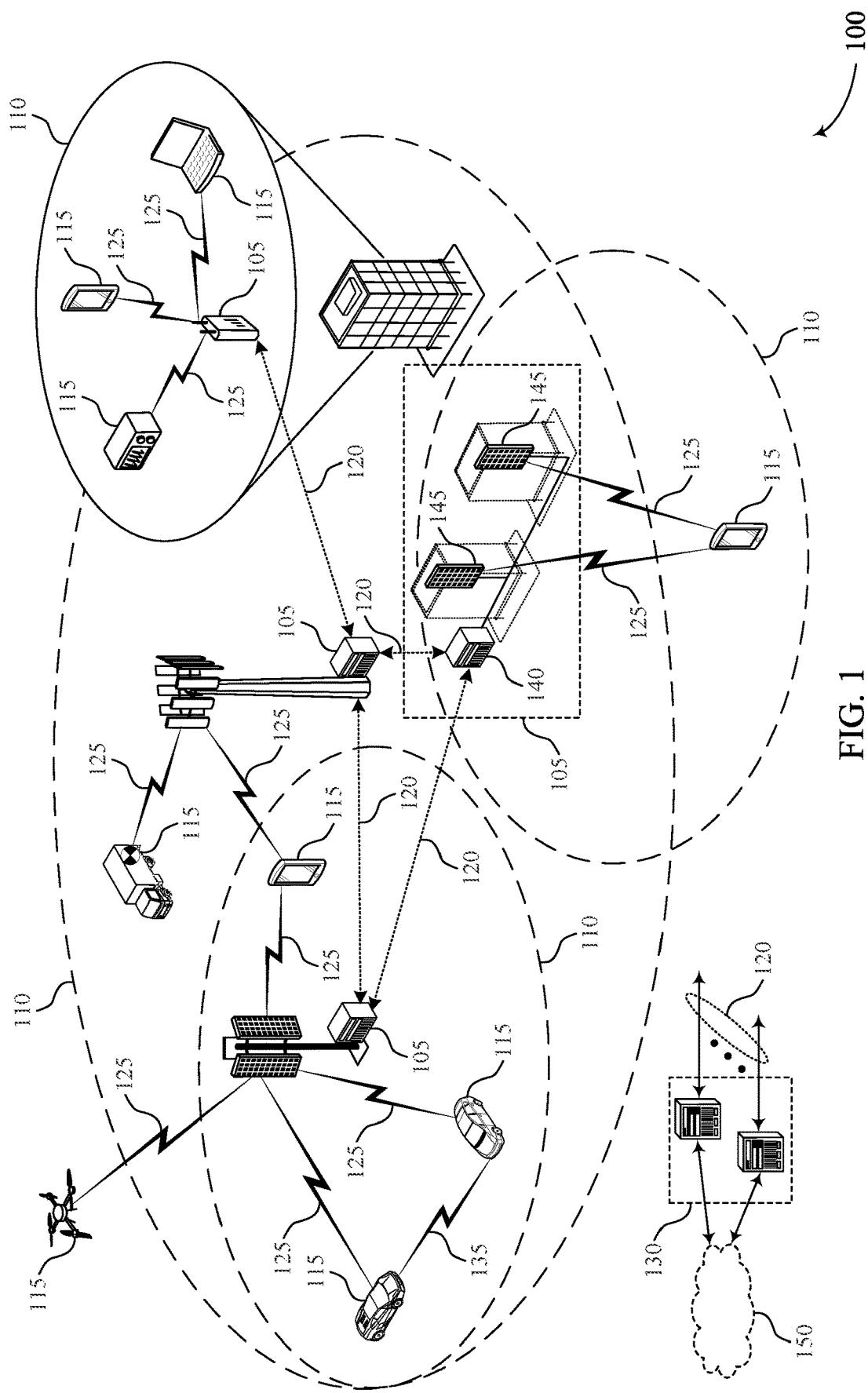
FIG. 1 illustrates an example of a wireless communications system that supports power boosting for uplink shared channel repetitions in accordance with aspects of the present disclosure.

In some wireless communication systems (e.g., in NR systems), user equipments (UEs) may support repetition of uplink transmissions, such as physical uplink shared channel (PUSCH) repetitions, to improve reliability of communications, to increase coverage of uplink transmissions, etc. As such, a UE may be configured to transmit an uplink message according to an uplink channel (e.g., PUSCH) repetition scheme. For example, in some cases, a UE may operate at a lower transmit power or on a smaller bandwidth than other (e.g., conventional) UEs, and a base station may configure uplink channel repetitions for the UE to transmit an uplink message to the base station.

In some cases, uplink channel repetitions may increase the chances that the base station correctly receives and decodes the uplink message (e.g., based on the additional opportunities for the base station to correctly receive an instance of the repeated uplink transmissions, based on the base station combining the uplink channel repetitions, etc.). For example, if a UE is configured with lower transmit power and/or smaller bandwidth, uplink transmissions from the UE may be more susceptible to interferences from other transmissions occurring on the same bandwidths (e.g., from nearby UEs, other base stations, etc.), and a base station may configure PUSCH repetitions to improve the reliability of such uplink transmissions.

In some cases, a UE may be configured to transmit uplink channel repetitions to multiple transmission/reception points (TRPs). In some cases, transmitting uplink channel repetitions to multiple TRPs may include transmitting one or more uplink channel repetitions to a first TRP and transmitting one or more uplink channel repetitions to a one or more second TRPs. In some examples, a UE may be configured to transmit uplink channel repetitions to multiple TRPs using time division multiplexing (TDM), which may include transmitting an uplink channel repetition to a first TRP at a first transmission occasion and transmitting an uplink channel repetition to a second TRP at a second transmission occasion, subsequent in time to the first transmission occasion. In some examples, a UE may be configured to transmit uplink channel repetitions to multiple TRPs using frequency division multiplexing, which may include transmitting an uplink channel repetition to a first TRP using a first frequency resource at a first transmission occasion and transmitting an uplink channel repetition to a second TRP using a second frequency resource at the first transmission occasion. In some examples, a UE may be configured to transmit uplink channel repetitions to multiple TRPs using space division multiplexing, which may include transmitting an uplink channel repetition to a first TRP using a set of spatial layer at a first transmission occasion and transmitting an uplink channel repetition to a second TRP using a second set of spatial layers at the first transmission occasion.

In some examples, a base station may configure a UE with uplink transmission repetitions via downlink control signaling, where downlink control indication (DCI) may schedule the UE with a number of PUSCHs over which a same transport block may be repeated. In some examples, a base station may configure a UE with a set of power control parameters for uplink transmission repetitions via DCI. In some examples, a UE may perform power control for an uplink transmission based at least in part on a set of configured uplink power control parameters. In some examples, the set of configured uplink power control parameters may include a set of open loop power control parameters.

Wireless communications systems may support uplink channel repetitions for various types of services for example, some wireless communications systems may support PUSCH repetition for ultra-reliable low-latency communications (URLLC) services and enhanced mobile broadband (eMBB) services. In some cases, URLLC communications may be considered higher priority transmission, while eMBB communications may be considered lower priority transmissions.

In some examples, a UE may support power boosting for a higher priority transmission (e.g., URLLC) in the event of a collision with a lower priority transmission (e.g., eMBB). In some examples, a UE may be configured to adjust the open loop power control parameters to adjust the transmission power in case of a collision. If a lower priority transmission is scheduled for transmission by a first UE to a first TRP, but a request for resources for a higher priority transmission is transmitted by a second UE to the first TRP using the resources scheduled for the lower priority transmission, and assigning different resources is not possible, the DCI that schedules the second UE can modify the power control parameters to boost the power for the higher priority traffic. In some cases, boosting the power for the higher priority traffic may include boosting the power for the uplink channel repetitions associated with the higher priority traffic.

In some examples, a first UE may be configured to transmit a higher priority uplink transmission using uplink channel repetitions to a first TRP and a second TRP. In some cases, the higher priority transmission may experience a collision with a lower priority transmission from a second UE at the first TRPs. In this case, the first UE may be configured to boost the transmission power for the higher priority uplink transmission, including the uplink channel repetitions. In some cases, the second TRP may not experience a collision between the higher priority transmission from the first UE and the lower priority transmission for the second UE; however, the first UE may still transmit the higher priority uplink transmission channel repetitions to the second TRP using the boosted transmission power. In this case, transmitting uplink channel repetitions to the second TRP using the boosted transmission power may be unnecessary and may degrade the systems performance by introducing additional interference.

The techniques described herein may provide for targeted power boosting for uplink channel repetitions toward different TRPs according to resource scheduling at a TRP. As discussed, some UEs may support uplink channel repetitions to multiple TRPs. Further, some UEs may support power boosting for higher priority transmissions (e.g., URLLC). In some examples, a UE may be configured with DCI that schedules an uplink transmission with two or more sets of transmission occasions where the different sets of transmission occasions may have different sets of transmission parameters.

In some examples, a first set of transmission occasions may be configured to be transmitted to a first TRP while a second set of transmission occasions may be configured to be transmitted to a second TRP. In some cases, a first set of transmission occasions may be configured with a first set of open-loop power control parameters and a second sets of transmission occasions may be configured with a second set of open-loop power control parameter. One or both of the first set of transmission occasions and the second set of transmission occasions may be configured with a set of open-loop power control parameters that boost the transmission power for the uplink channel repetitions.

In some examples, the set of open loop power control parameters for each set of transmission occasions may be configured based on Radio Resource Control (RRC) Configuration. In some examples, the open-loop power control parameter set indication field is applied based on the RRC configuration. In some examples, the set of open loop power control parameters for each set of transmission occasions may be dynamically configured by DCI. DCI may separately control whether power boost should be applied to a first set of transmission occasions or a second set of transmission occasions. In some cases, a new field may be added to the DCI that indicates whether the open-loop power control parameter set indication field is applied to the first set of transmission occasions, the second set of transmission occasions, or both sets of transmission occasions, or both sets of transmission occasions. In some examples, DCI may include a secondary open-loop power control parameter set indication field, where the first open-loop power control parameter set indication field corresponds to the first set of transmission occasions and the second open-loop power control parameter set indication fields correspond to the second set of transmission occasions. In some examples, the most significant bit or bits of the open-loop power control parameter set indication field may be applied to the first set of transmission occasions and the least significant bit or bits of the field is applied to the second set of transmission occasions. In some examples, the same value of open-loop power control parameter set indication field may be applied via DCI to both sets of transmission occasions, but each codepoint may be mapped to a par of additional open-loop power control parameters.

Aspects of the disclosure are initially described in the context of wireless communications systems. Additionally, aspects of the disclosure are illustrated by additional wireless communications systems, time-frequency resource configurations, and example process flow diagrams. Aspects of the disclosure are further illustrated by and described with reference to apparatus diagrams, system diagrams, and flowcharts that relate to power boosting for uplink shared channel repetitions.

FIG. 1 illustrates an example of a wireless communications system 100 that supports power boosting for uplink shared channel repetitions in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The described techniques relate to improved methods, systems, devices, or apparatuses that support power boosting for PUSCH repetitions targeted toward different TRPs. In some examples, a UE may use different transmission powers to transmit different PUSCH repetitions to one or more different TRPs. In some examples, a UE may be configured with different sets of transmission parameters for each PUSCH repetition transmission occasion. In some examples, a UE may be configured to boost the power of a PUSCH repetition at a first transmission occasion to a first TRP and to not boost the power of a PUSCH repetition at a second transmission occasion to a second TRP.

Figure 2:
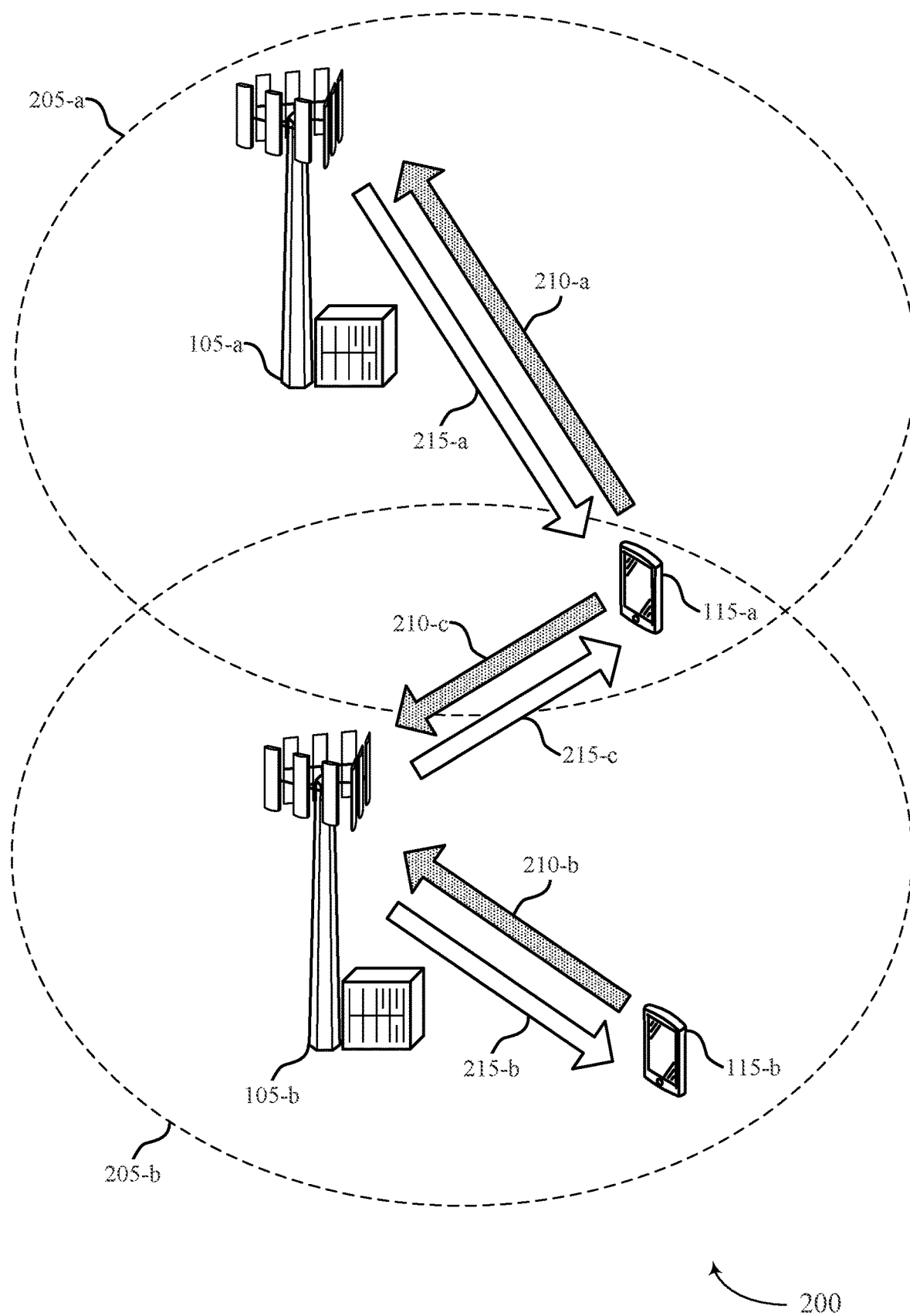
FIG. 2 illustrates an example of a wireless communications system that supports power boosting for uplink shared channel repetitions in accordance with aspects of the present disclosure.

FIG. 2 illustrates an example of a wireless communications system 200 that supports power boosting for uplink shared channel repetitions in accordance with aspects of the present disclosure. In some examples, wireless communications system 200 may implement aspects of wireless communication system 100. For example, wireless communication system 200 may include one or more base stations 105 and one or more UEs 115, which may represent examples of a base station 105 and UE 115 described with reference to FIG. 1. Wireless communications system 200 may, for example, include two or more UEs 115 such as UE 115-*a* and UE 115-*b* and two or more base stations 105 such as base station 105-*a* and base station 105-*b*. UE 115-*a* may be in coverage area 205-*a*, served by base station 105-*a*, and in coverage area 205-*b*, served by base station 105-*b*. UE 115-*a* may communicate with base station 105-*a*, base station 105-*b*, or both. UE 115-*b* may be in coverage are 205-*b*, served by base station 105-*b*. UE 115-*b* may communicate with base station 105-*b*. In some cases, UE 115-*a* may support power boosting for uplink channel repetitions targeted toward different TRPs.

In some examples, UE 115-*b* may be configured with resources to transmit uplink transmission 210-*b* to base station 105-*b*. In some cases, UE 115-*b* may be configured with resource to transmit using eMBB or a massive machine type communication. UE 115-*b* may be configured with time and frequency resources to transmit an eMBB communication at a first time and on a first frequency resource. UE 115-*b* may transmit uplink channel repetitions to base station 105-*b* or to base station 105-*b* and another base station within the coverage are of UE 115-*b*.

In some examples, UE 115-*a* may transmit a schedule request to request resources to transmit an uplink transmission. In some cases, the uplink transmission may be a high priority transmission such as a URLLC. In response to the schedule request, UE 115-*a* may be configured with resources via downlink control information (DCI) to transmit a high priority uplink transmission (e.g., a URLLC) using one or more uplink channel repetitions. In some examples, UE 115-*a* may be configured to transmit one or more uplink channel repetitions to one or more TRPs. For example, UE 115-*a* may be configured to transmit one or more uplink channel repetitions to base station 105-*a* via URLLC uplink transmission 210-*a* and UE 115-*a* may also be configured to transmit one or more uplink channel repetitions to base station 105-*b* via URLLC uplink transmission 210-*c*.

In some examples, UE 115-*a* may be configured with resources for URLLC uplink transmission 210-*c* that conflict or collide with uplink resources configured for uplink transmission 210-*b* by UE 115-*b* at base station 105-*b*. For example, and eMBB uplink transmission 210-*b* may be configured for UE 115-b for a first set of time and frequency resources prior to receiving a schedule request for URLLC uplink transmission 210-c from UE 115-a. In some cases, it may not be possible to assign different resources to either UE 115-a for URLLC uplink transmission 210-c or UE 115-b for eMBB uplink transmission. In some cases, the communication system 200 may give priority to the URLLC uplink transmission 210-cover eMBB uplink transmission 210-b at base station 105-b. In some cases, URLLC uplink transmission 210-c may be configured with transmission parameters to enable reception of URLLC uplink transmission 210-c if eMBB uplink transmission 210-b and URLLC uplink transmission 210-c are configured on the same time and frequency resources.

In some examples, UE 115-a may be configured with transmission parameters to boost the transmission power for the uplink channel repetitions to enable reception of the uplink channel repetitions when eMBB uplink transmission 210-b and URLLC uplink transmission 210-c are configured on the same time and frequency resources. In some examples, UEs 115, such as UE 115-a and UE 115-b may determine the transmission power for the uplink channel repetitions according to the following equation:

$$P_{PUSCH,b,f,c}(i,j,q_d,l) = \min\{P_{CMAX,f,c}(i), P_{O_{PUSCH},b,f,c}(j) + 10 \cdot \log_{10}((2^\mu) \cdot M_{RB,b,f,c}^{PUSCH}(i)) + \alpha_{b,f,c}(j) \cdot PL_{b,f,c}(q_d) + \Delta_{TF,b,f,c}(i) + f_{b,f,c}(i,l)\}$$

where $P_{CMAX,f,c}(i)$ is the maximum transmit power, $P_{O_{PUSCH},b,f,c}(j)$ is the target power, $\alpha_{b,f,c}(j)$ is the pathloss scaling factor, $PL_{b,f,c}(q_d)$ is the pathloss between the UE and serving base station, $\Delta_{TF,b,f,c}(i)$ accounts for the modulation and coding scheme and code rate for uplink transmission, $2^\mu \cdot M_{RB,b,f,c}^{PUSCH}(i)$ is the bandwidth of the uplink transmission, and $f_{b,f,c}(i,l)$ is the closed loop power control value.

In some examples, UEs 115 may be configured with a set of uplink power control parameters via DCI from a base station 105. As a demonstrative example, the set of uplink power control parameters for a PUSCH transmission are described herein. A UE 115 may be configured for two separate loops for closed loop power control and TPC commands may be applied separately for the two loops if the parameter twoPUSCH-PC-AdjustementStates is configured. Additionally, a UE 115 may be configured with a set of $P_{O_{PUSCH},b,f,c}(j)$ and $\alpha_{b,f,c}(j)$ values for open-loop power control, where each member in the set has an identifier (e.g., $P_O$-PUSCH-AlphaSetID: 0, 1, . . . , 29). In some cases, the set of $P_{O_{PUSCH},b,f,c}(j)$ and $\alpha_{b,f,c}(j)$ values may be referred to as $P_O$-AlphaSets. A UE 115 may also be configured with a list of pathloss reference signals (RS), where each member of the list may have an identifier (e.g., PUSCH-PathlossReferenceRS-ID: 0, 1, . . . , 3). A UE 115 may also be configured with a list of sounding reference signal (SRS) resource indicators (SRI)—PUSCH mapping, where each member of the list has and identifier (e.g., SRI-PUSCH-PowerControlId: 0, . . . , 15). In some cases, each member of the SRI-PUSCH mapping list may be configured as SRI-PUSCH-MapplingToAddModList as follows: SEQUENCE (SIZE (1 . . . maxNRofSRIP-PUSCH-Mappings)) of SRI-PUSCH-PowerControl. For example, SRI-PUSCH-PowerControl may be defined as SEQUENCE {SRI-PUSCH-PowercontrolID, PUSCH-PathlossReferenceRS-Id, $P_O$-PUSCH-AlphaSetID, ENUMERATED {i0, i1}}.

In some examples, UEs 115 may use SRI-PUSCH-PowerControlId as a codepoint of the SRI field in the DCI. In some cases, if the value of the SRI field in the uplink DCI that schedules the PUSCH is a first value, then the uplink power control parameters (e.g., $PL_{b,f,c}(q_d)$, $P_{O_{PUSCH},b,f,c}(j)$, $\alpha_{b,f,c}(j)$, $f_{b,f,c}(i,l)$) corresponding to SRI-PUSCH-PowerControlId corresponding to the first value may be used for the PUSCH transmission. In some cases, the SRI field can be up to 4 bits depending on configurations.

In some examples, DCI may be configured to indicate power boosting for URLLC. In some examples, DCI format 0-1 or 0-2 can be configured with an open-loop power control parameter set indication field. In some cases, the open-loop power control parameter set indication field may be present if RRC parameter $P_O$-PUSCH-SetList-r16 is configured. If RRC parameter $P_O$-PUSCH-SetList-r16 is not configured, then the open-loop power control parameter set indication field may be zero bits. In some cases, if an SRI field is present in the DCI, the field is one bit and RRC parameter $P_O$-PUSCH-List-r16 may contain one value. In some cases, if the SRI field is set to zero, the SRI field value may map to SRI-PUSCH-PowerControlId from which $P_O$ and other uplink power control parameters are determined, which may indicate no power boost for the uplink transmission. In some cases, if the SRI field is set to 1, the SRI field value may map to $P_O$-PUSCH-SetId-r16 from which $P_O$ is determined, which may correspond to using a different $P_O$ value for open loop power control and may indicate power boost for the uplink transmission. In some examples, if an SRI field is not present in the DCI, the field may be either one bit or 2 bits depending on RRC parameter olpc-ParameterSet, which may be separately configurable for DCI format 0-1 and 0-2. In some cases, if the SRI field is 0 or 00, $P_O$ may be determined from a first $P_O$-PUSCH-AlphaSet in $P_O$-AlphaSets, which may indicate no power boost. In some cases, if the SRI field is 1 or 01, $P_O$ may be determined from a first value in $P_O$-PUSCH-Set-r16 with the lowest $P_O$-PUSCH-SetID value, which may indicate a first power boost value. In some cases, if the SRI field is 10, $P_O$ may be determined from a second value in $P_O$-PUSCH-Set-r16 with the lowest $P_O$-PUSCH-SetID value, which may indicate a second power boost value when the SRI field is 2 bits.

In some examples, UE 115-a may be configured via with two or more sets of transmission parameters for different transmission occasions of an uplink channel repetition. In some examples, the two or more sets of transmission parameters may be configured for different transmission occasions of an uplink channel repetition. The different sets of transmission parameters may configure UE 115-a to increase the transmission power for one or more of the transmission occasions of an uplink channel repetition. In some cases, UE 115-a may be configured with different sets of transmission parameters for different transmission occasions of an uplink channel repetition such that the transmission power for a first transmission occasion to a first TRP may be higher than the transmission power for a second transmission occasion to a second TRP. For example, UE 115-a may be configured to use a boosted transmission power for one or more uplink channel repetitions transmitted via URLLC uplink transmission 210-c to base station 105-b and to use a non-boosted transmission power for the one or more uplink channel repetitions transmitted via URLLC uplink transmission 210-a to base station 105-a.

In some examples, UE 115-a may receive DCI that configures the open-loop power control parameter set indication field to applied to either only the first set of transmission occasions, only the second set of transmission occasions, or both sets of transmission occasions based on RRC configuration. In some cases, based on RRC configuration, the open-loop power control parameter set indication field is applied to only the first set of transmission occasions and the second set of transmission occasions follow SRI indication for determination of $P_O$ and other uplink power control parameters when SRI field is present. Alternatively, the second set of transmission occasions may follow the first $P_O$-PUSCH-AlphaSet in $P_O$-AlphaSets when the SRI field is not present. In some cases, the first set of transmission occasions may follow either the SRI indication for determination of $P_O$ and other power control parameters, the first $P_O$-PUSCH-AlphaSet in $P_O$-AlphaSets, or the additional $P_O$ values in $P_O$-PUSCH-SET-r16 depending on the value of the field open-loop power control parameter set indication.

In some examples, UE 115-*a* may receive DCI where the DCI may dynamically indicate the value of $P_O$ to apply for configuring the power for the first set of uplink transmission occasions and the second set of uplink transmission occasions separately. In some cases, the DCI may dynamically indicate if a different values for $P_O$ are configured for different transmission occasions. The different values for $P_O$ may be additional or higher $P_O$ values than $P_O$-PUSCH-AlphaSet. In some cases, a new field may be added to the DCI to indicate whether the open-loop power control parameter set indication field is applied to the first set of transmission occasions, the second set of transmission occasions, or both set of transmission occasions.

In some examples, UE 115-*a* may receive DCI where the DCI may dynamically indicate the value of $P_O$ to apply for configuring the power for the first set of uplink transmission occasions and the second set of uplink transmission occasions by configuring an open-loop power control parameter set indication field for each set of transmission occasions. For example, the DCI may configure a first open-loop power control parameter set indication field, corresponding to the first set of transmission occasions, and a second open-loop power control parameter set indication field, corresponding to the second set of transmission occasions. In some cases, the presence of the second open-loop power control parameters set indication fields for the second set of transmission occasions may be separately configured by an RRC parameter. In some cases, when DCI schedule only one set of PUSCH transmission occasions, the second open-loop power control parameter set indication field may be set to zero.

In some examples, UE 115-*a* may receive DCI where the DCI may dynamically indicate the value of $P_O$ to apply for configuring the power for the first set of uplink transmission occasions and the second set of uplink transmission occasions by configuring the most significant bit or bits of the open-loop power control parameter set indication field to indicate the transmission power for the first set of transmission occasions and configuring the least significant bit or bits of the open-loop power control parameter set indication field to indicate the transmission power for the second set of transmission occasions. In some cases, when the DCI schedule one set of PUSCH transmission occasions, the least significant bit or bits of the open-loop power control parameter set indication field may be set to zero.

In some examples, UE 115-*a* may receive DCI where the DCI may include two SRI fields or two sets of bits in the SRI field where each SRI field or each set of bits in the SRI field correspond to one of the two sets of transmission occasions. In some examples, the first SRI field or first set of bits of the SRI field may correspond to the first open-loop power control parameter set indication field or the first set of bits of the open-loop power control parameter set indication field. In some examples, the second SRI field or second set of bits of the SRI field may correspond to the second open-loop power control parameter set indication field or the second set of bits of the open-loop power control parameter set indication field. In some examples, the RRC parameter $P_O$-PUSCH-SetList-r16 can be the same, or two different lists can be configured corresponding to the two sets of transmission occasions and the two open-loop power control parameter set indication fields or the two sets of bits of the open-loop power control parameter set indication field.

In some examples, UE 115-*a* may apply the same open-loop power control parameter set indication field or bits of the open-loop power control parameter set indication field to both sets of transmission occasions but each codepoint may be mapped to a pair of additional $P_O$ values. In some cases, when SRI is present and the open-loop power control parameter set indication field is set to zero, the SRI value may determine the pair of $P_O$ values for open-loop power control. In some cases, when SRI is present and the open-loop power control parameter set indication field is set to one, the SRI value may be mapped to $P_O$-PUSCH-SetId-r16 associated with the pair of additional $P_O$ values. In some cases, the corresponding $P_O$-List-r16 may be used for the first set of transmission occasions and $P_O$-second-List-r17 may be used for the second set of transmission occasions. In some cases, if SRI is not present and the open-loop power control parameter set indication field is not set to zero or 00, the pair of $P_O$ values may be determined from additional $P_O$ values in $P_O$-PUSCH-Set-r16 with the lowest $P_O$-PUSCH-SetId-r16. In some cases, the corresponding $P_O$-List-r16 may be used for the first set of transmission occasions and $P_O$-second-List-r17 may be used for the second set of transmission occasions.

Figure 3A:
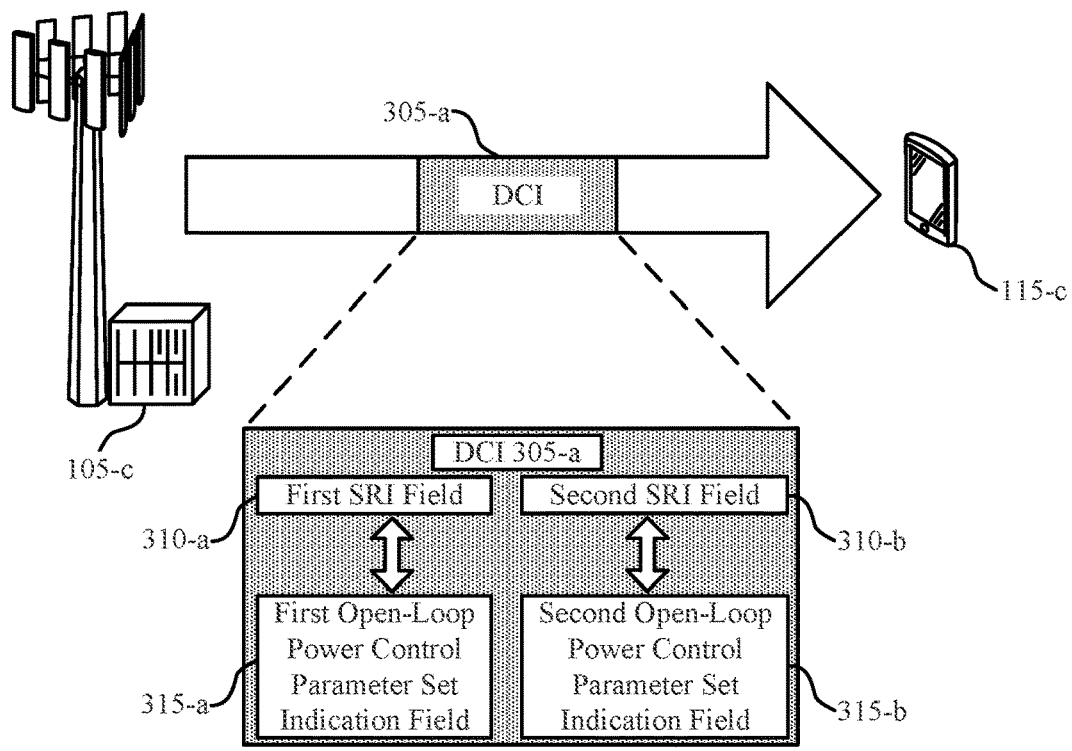
FIGS. 3A and 3B illustrate examples of wireless communications systems that supports power boosting for uplink shared channel repetitions in accordance with aspects of the present disclosure.
Figure 3B:
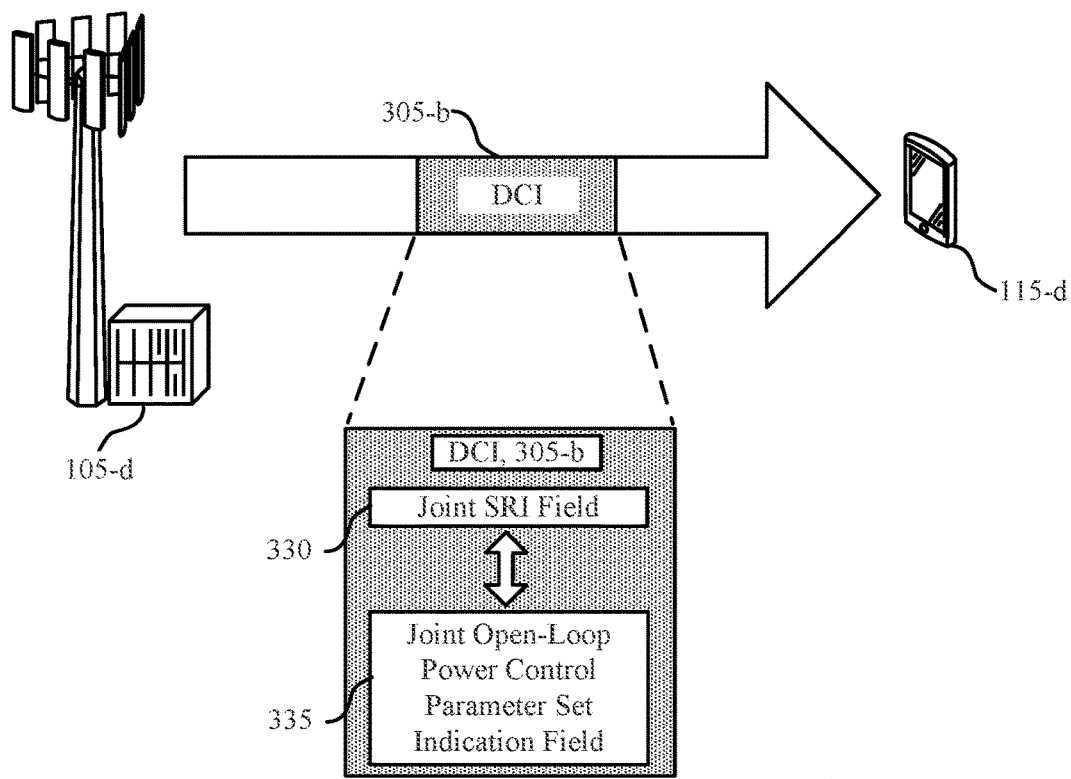

FIGS. 3A and 3B illustrate examples of wireless communications system 300-*a* and wireless communications system 300-*b* that supports power boosting for uplink shared channel repetitions in accordance with aspects of the present disclosure. In some examples, wireless communications system 300-*a* and wireless communications system 300-*b* may implement aspects of wireless communication system 100. For example, wireless communication system 300-*a* and wireless communications system 300-*b* may include one or more base stations 105 and one or more UEs 115, which may represent examples of a base station 105 and UE 115 described with reference to FIG. 1. In wireless communications system 300-*a* and wireless communications system 300-*b*, a UE 115 may receive DCI from a base station 105.

FIG. 3A illustrates an example of a wireless communications system 300-*a* that supports power boosting for PUSCH repetitions. In FIG. 3A, base station 105-*c* may transmits DCI 305-*a* to UE 115-*c*. In some cases, base station 105-*c* may transmit DCI 305-*a* to UE 115-*c* in response to a schedule request from UE 115-*c*. In some cases, the schedule request from UE 115-*c* may contain indications such as but not limited to a transmission priority, a communication type (i.e., eMBB, URLLC, . . . etc.), and uplink channel repetition capabilities.

In some examples, base station 105-*c* may transmit DCI 305-*a* to UE 115-*c* where DCI 305-*a* may include two SRI fields, such as first SRI field 310 and second SRI field 320, where each SRI field corresponds to one of the two sets of transmission occasions. In some examples, the first SRI field 310-*a* may correspond to the first open-loop power control parameter set indication field 315-*a*. In some examples, the second SRI field 310-*b* may correspond to the second open-loop power control parameter set indication field 315-*b*. In some examples, the RRC parameter $P_O$-PUSCH-SetList-r16 can be the same, or two different lists can be configured corresponding to the two sets of transmission occasions and the two open-loop power control parameter set indication fields 315.

In some examples, UE 115-c may use one or more of the first SRI field 310-a and the first open-loop power control parameter set indication field 315-a to determine a transmission power for an uplink channel repetition for a first set of transmission occasions. In some examples, UE 115-c may use one or more of the second SRI field 310-b and the second open-loop power control parameter set indication field 315-b to determine a transmission power for an uplink channel repetition for a second set of transmission occasions.

FIG. 3B illustrates an example of a wireless communications system 300-b that supports power boosting for PUSCH repetitions. In FIG. 3b, base station 105-d may transmits DCI 305-b to UE 115-d. In some cases, base station 105-d may transmit DCI 305-b to UE 115-d in response to a schedule request from UE 115-d. In some cases, the schedule request from UE 115-d may contain indications such as but not limited to a transmission priority, a communication type (i.e., eMBB, URLLC, . . . etc.), and uplink channel repetition capabilities.

In some examples, base station 105-d may transmit DCI 305-b to UE 115-d where DCI 305-b may include joint SRI field 330 and joint open-loop power control parameter set indication 335. In some examples, the open-loop power control parameter set indication field configured in the joint open-loop power control parameter set indication 335 may be applied to both sets of transmission occasions, but each codepoint may be mapped to a pair of additional open loop power control parameters. In some cases, the mapping to a pair of additional open loop power control parameters may depend on the configuration of joint SRI field 330. In some cases, when join SRI field 330 is configured and the joint open-loop power control parameter set indication field 335 is set to zero, the value of joint SRI field 330 may determine the pair of $P_O$ values for open-loop power control. In some cases, when joint SRI field 330 is configured and the joint open-loop power control parameter set indication field 335 is set to one, the value of the joint SRI field 330 may be mapped to $P_O$-PUSCH-SetId-r16 associated with the pair of additional $P_O$ values. In some cases, the corresponding $P_O$-List-r16 may be used for the first set of transmission occasions and $P_O$-second-List-r17 may be used for the second set of transmission occasions. In some cases, if joint SRI field 330 is not configured and the joint open-loop power control parameter set indication field 335 is not set to zero or 00, the pair of $P_O$ values may be determined from additional $P_O$ values in $P_O$-PUSCH-Set-r16 with the lowest $P_O$-PUSCH-SetId-r16. In some cases, the corresponding $P_O$-List-r16 may be used for the first set of transmission occasions and $P_O$-second-List-r17 may be used for the second set of transmission occasions.

In some examples, UE 115-d may use the joint SRI field 330 and the joint open-loop power control parameter set indication field 335 to determine a transmission power for uplink channel repetitions for a first set of transmission occasions and a second set of transmission occasions.

Figure 4:
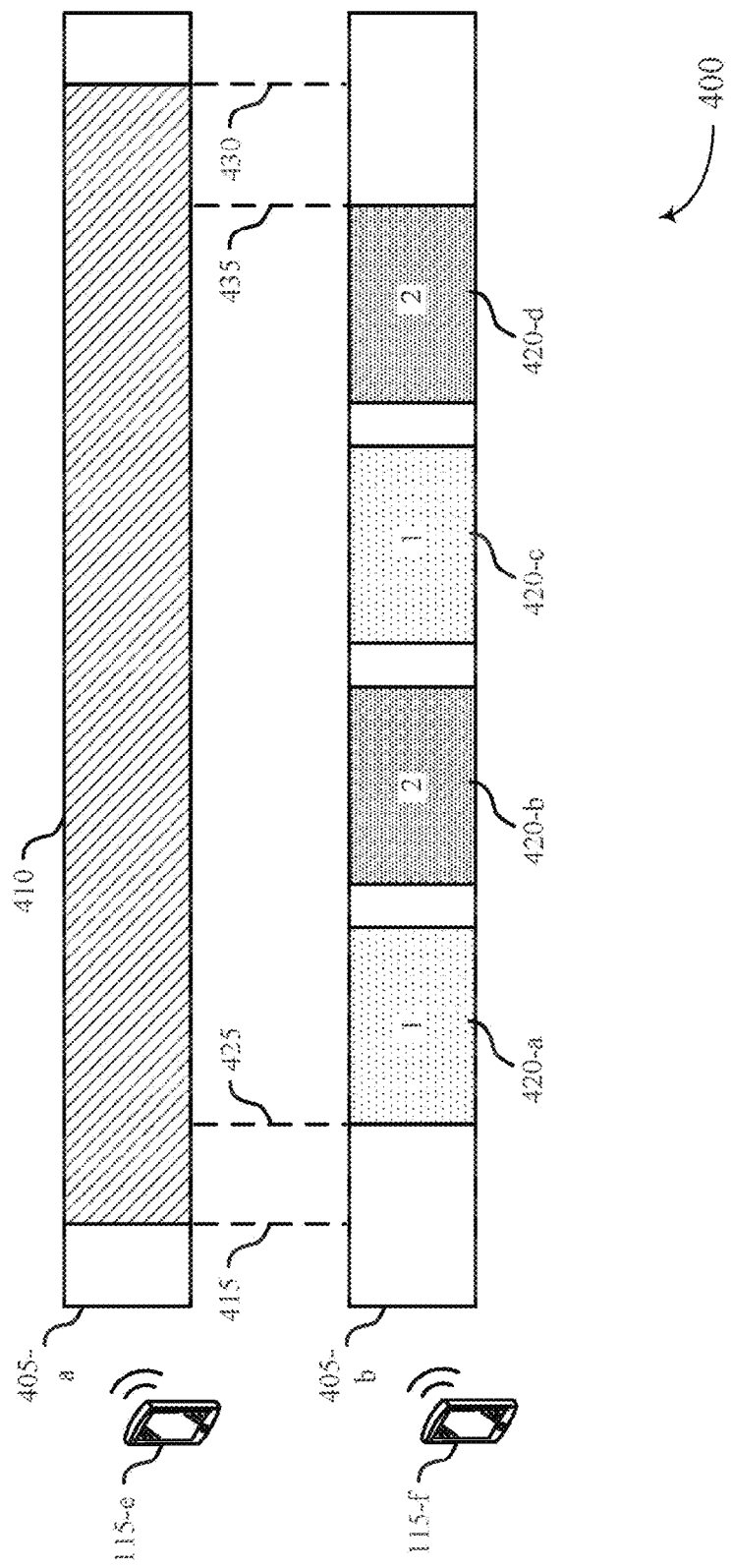
FIG. 4 illustrates an example of a time-frequency resource configuration that supports power boosting for uplink shared channel repetitions in accordance with aspects of the present disclosure.

FIG. 4 illustrates an example of a time-frequency resource configuration 400 that supports power boosting for uplink shared channel repetitions in accordance with aspects of the present disclosure. In some examples, time-frequency resource configuration 400 may implement aspects of wireless communication system 100. In some examples, time-frequency resource configuration 405-a and time-frequency resource configuration 405-b may be examples of time-frequency resource configurations used for transmission in wireless communications system 100. Time-frequency resource configuration 405-a may configure resources for UE 115 e. Time-frequency resource configuration 405-b may configure resources for UE 115-f. In some examples, Time-frequency resource configuration 405-a and time-frequency resource configuration 405-b may configure UE 115-e and UE 115-f to transmit concurrent uplink transmission on the same frequency resources.

In some examples, UE 115-e may be configured to transmit a first uplink transmission 410 to a first base station on a first frequency resource starting at first time 415. In some examples, first uplink transmission 410 may be a lower priority transmission, such as an eMBB transmission.

In some examples, UE 115-f may be configured to transmit a second uplink transmission 420 on the first frequency resource. In some examples, second uplink transmission 420 may be a higher priority transmission, such as a URLLC transmission. UE 115-f may transmit uplink channel repetitions of second uplink transmission 420 to improve the reliability of the communication of second uplink transmission 420. In some examples, UE 115-f may transmit uplink channel repetitions using TDM such that first uplink channel repetition 420-a, second uplink channel repetition 420-b, third uplink channel repetition 420-c, and fourth uplink channel repetition 420-d are separated in time.

In some examples, the uplink channel repetitions may be transmitted to different base stations to diversify the signal path to increase the reliability of the communication. For example, first uplink channel repetition 420-a and third uplink channel repetition 420-c may be configured to be transmitted to the first base station and second uplink channel repetition 420-b and uplink channel repetition 420-c may be configured to be transmitted to a second base station. In some examples, one or more of the transmission occasions of uplink channel repetition for second uplink transmission 420 may be configured for transmission to the same base station as the first uplink transmission 410 form UE 115-e. In some cases, first uplink transmission 410, first uplink channel repetition 420-a and third uplink channel repetition 420-c may be configured for transmission to the first base station using the same time and frequency resources. In some examples, first uplink transmission 410

In some examples, UE 115-f may be configured with transmission parameters to boost the transmission power for the first uplink channel repetition 420-a and third channel repetition 420-c to enable reception at the first base station over the first uplink transmission 410 from UE 115-e. In some examples, UE 115-f may be configured with transmission parameters to transmit first uplink channel repetition 410-a and third uplink channel repetition 410-c with a higher transmission power than second uplink channel repetition 420-b and fourth uplink channel repetition 420-d. The determination to boost the transmission power for first uplink channel repetition 420-a and third uplink channel repetition 420-c may be based at least in part on the identified conflict of transmission resources and the priorities of the first uplink transmission 410 and the second uplink transmission 420.

The example illustrated in time-frequency resource configuration 400 illustrates and example where UE 115-f is configured to transmit uplink channel repetitions using TDM. In some examples, UE 115-f may be configured with resources to transmit uplink channel repetitions using FDM or SDM. Power boosting for uplink shared channel repetition may be similarly applied to mitigate resource conflicts for higher priority transmission when using FDM or SDM uplink channel repetitions.

Figure 5:
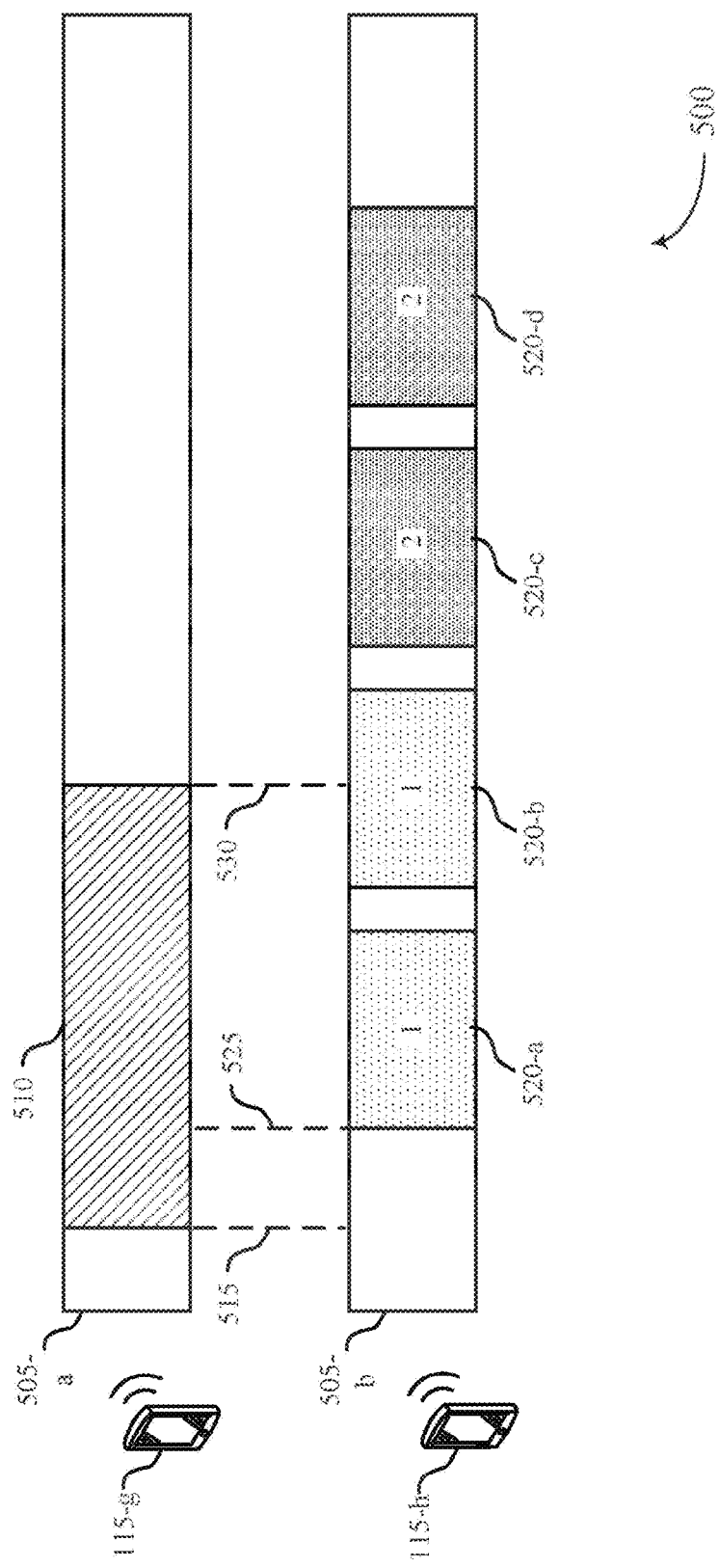
FIG. 5 illustrates an example of a time-frequency resource configuration that supports power boosting for uplink shared channel repetitions in accordance with aspects of the present disclosure.

FIG. 5 illustrates an example of a time-frequency resource configuration 500 that supports power boosting for uplink shared channel repetitions in accordance with aspects of the present disclosure. In some examples, time-frequency resource configuration 500 may implement aspects of wireless communication system 100. In some examples, time-frequency resource configuration 505-a and time-frequency resource configuration 505-b may be examples of time-frequency resource configurations used for transmission in wireless communications system 100. Time-frequency resource configuration 505-a may configure resources for UE 115-f Time-frequency resource configuration 505-b may configure resources for UE 115-h. In some examples, time-frequency resource configuration 505-a and time-frequency resource configuration 505-b may configure UE 115-g and UE 115-h to transmit concurrent uplink transmission on the same frequency resources.

In some examples, UE 115-g may be configured to transmit a first uplink transmission 510 to a first base station on a first frequency resource starting at first time 515. In some examples, UE 115-g may be configured with resources to transmit first uplink transmission 510 until second time 530. In some examples, first uplink transmission 510 may be a lower priority transmission, such as an eMBB transmission.

In some examples, UE 115-h may be configured to transmit a second uplink transmission 520 on the first frequency resource. In some examples, the second uplink transmission 520 may be configured to begin at third time 525, which may be after first time 515 but before second time 530. In some examples, second uplink transmission 520 may be a higher priority transmission, such as a URLLC transmission. UE 115-h may transmit uplink channel repetitions of second uplink transmission 520 to improve the reliability of the communication of second uplink transmission 520. In some examples, UE 115-h may transmit uplink channel repetitions using TDM such that first uplink channel repetition 520-a, second uplink channel repetition 520-b, third uplink channel repetition 520-c, and fourth uplink channel repetition 520-d are separated in time. In some examples, first uplink channel repetition 520-a may overlap in time with first uplink transmission 510. In some examples, second uplink channel repetition 520-b may partially overlap or not overlap in time with first uplink transmission 510.

In some examples, the uplink channel repetitions may be transmitted to different base stations to diversify the signal path to increase the reliability of the communication. For example, first uplink channel repetition 520-a and second uplink channel repetition 520-b may be configured to be transmitted to the first base station and third uplink channel repetition 520-c and fourth uplink channel repetition 520-d may be configured to be transmitted to a second base station. In some examples, one or more of the transmission occasions of uplink channel repetition for second uplink transmission 520 may be configured for transmission to the same base station as the first uplink transmission 510 form UE 115-g. In some cases, first uplink transmission 510, first uplink channel repetition 520-a and second uplink channel repetition 520-b may be configured for transmission to the first base station using the same time and frequency resources. In some examples, first uplink transmission 510

In some examples, UE 115-h may be configured with transmission parameters to boost the transmission power for the first uplink channel repetition 520-a and second channel repetition 520-b to enable reception at the first base station over the first uplink transmission 510 from UE 115-g. In some examples, UE 115-h may be configured with transmission parameters to transmit first uplink channel repetition 510-a and second uplink channel repetition 510-b with a higher transmission power than third uplink channel repetition 520-c and fourth uplink channel repetition 520-d. The determination to boost the transmission power for first uplink channel repetition 520-a and second uplink channel repetition 520-b may be based at least in part on the identified conflict of transmission resources and the priorities of the first uplink transmission 510 and the second uplink transmission 520.

In some examples, first uplink channel repetition 520-a and second uplink channel repetition 520-b may be configured to be transmitted to a different base station than first uplink transmission 510. In this case, UE 115-h may be configured with transmission parameters that do not boost the transmission power for first uplink channel repetition 520-a and second uplink channel repetition 520-b. In some cases, third uplink channel repetition 520-c and fourth uplink channel repetition 520-d may be transmitted to the same base station as first uplink transmission 510 on the same frequency resource, but UE 115-h may be configured with transmission parameters that do not boost the transmission power for the third uplink channel repetition 520-c and the fourth uplink channel repetition 520-d based at least in part on the transmission not overlapping in time.

Figure 6:
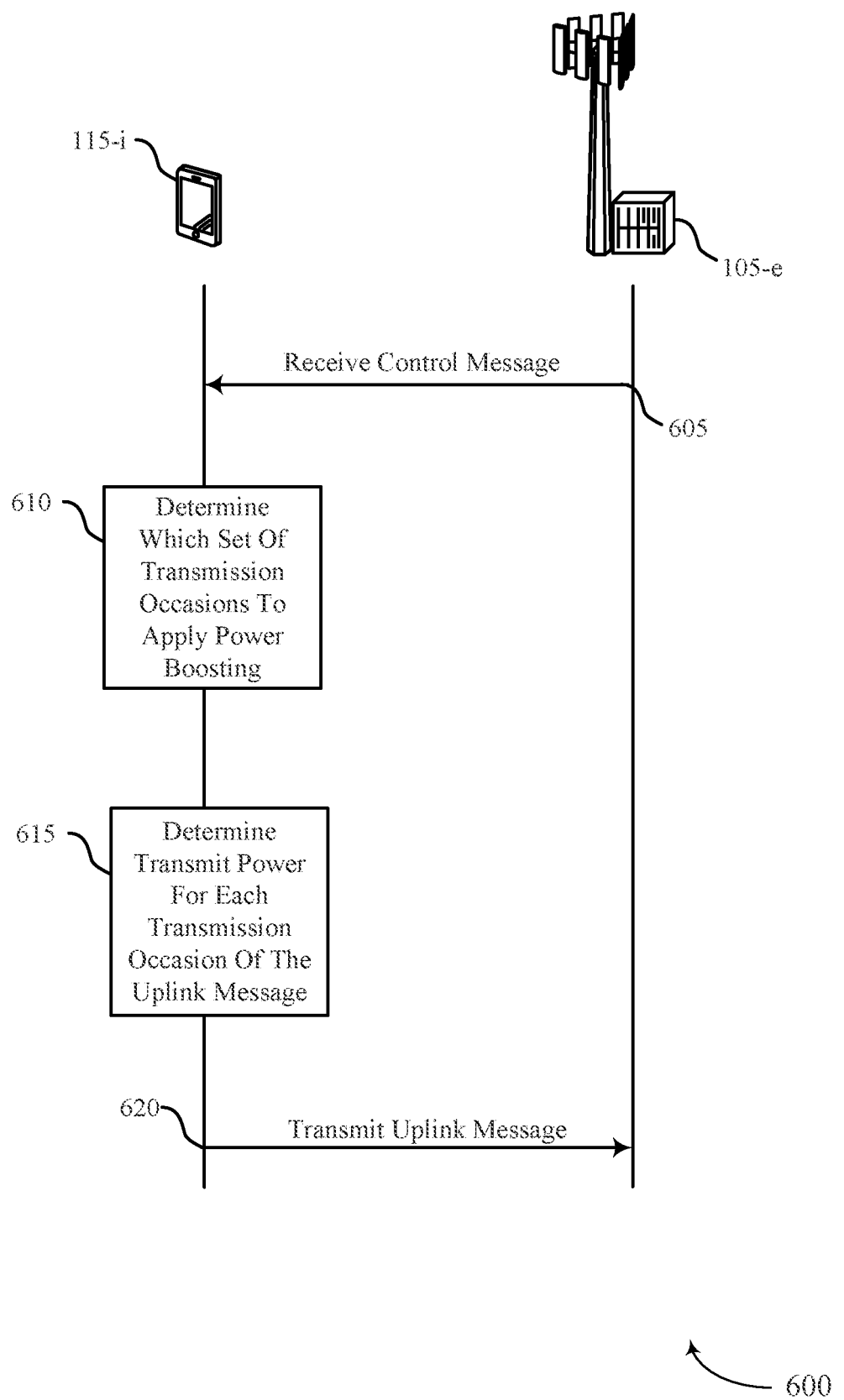
FIG. 6 illustrates an example of a process flow that supports power boosting for uplink shared channel repetitions in accordance with aspects of the present disclosure.

FIG. 6 illustrates an example of a process flow 600 that supports power boosting for uplink shared channel repetitions in accordance with aspects of the present disclosure. In some examples, process flow 600 may implement aspects of wireless communication system 100. Process flow 600 may include a base station 105-e and a UE 115-i, which may be examples of corresponding base stations 105 and UEs 115, as described above with reference to FIGS. 1-5. In the following description of the process flow 600, the operations between UE 115-i and base station 105-e may be transmitted in a different order than the order shown, or the operations performed by base station 105-e and UE 115-i may be performed in different orders or at different times. Certain operations may also be left out of the process flow 600, or other operations may be added to the process flow 600. It is to be understood that while base station 105-e and UE 115-i are shown performing a number of the operations of process flow 600, any wireless device may perform the operations shown.

At 605, UE 115-i may receive, from a base station, a control message that schedules a set of transmission occasions for one or more uplink messages for the UE. In some examples, UE 115-i may also receive a second control message before receiving the control message, where the second control message comprises the power boost configuration indicating which of the set of transmission occasions to apply power boosting. In some cases, the second control message may be received via RRC.

At 610, UE 115-i may determine a power boost configuration for the UE, where the power boost configuration indicating which of the set of transmission occasions to apply power boosting. In some examples, determining the power boost configuration may be based at least in part on the control message, where the control message comprises a field that indicates which of the set of transmission occasions to apply power boosting. In some examples, UE 115-i may determine a first set of uplink power control parameters for a first subset of the set of transmission occasions based at least in part on a first set of bits of a parameter field in the control message and determine a second set of uplink power control parameters for a second subset of the set of transmission occasions based at least in part on a second set of bits of the parameter field in the control message.

In some cases, at 610, UE 115-*i* may determine a first open loop power control parameter for a first subset of the set of transmission occasions based at least in part on the control message comprising a joint parameter field and a joint resource field indicating a first value of a pair of values for open loop power control for the first subset of the set of transmission occasions. In some cases, UE 115-*i* may also determine a second open loop power control parameter for a second subset of the set of transmission occasions based at least in part on the control message comprising the joint parameter field and the joint resource field indicating a second value of the pair of values for open-loop power control for the second subset of the set of transmission occasions. In some cases, UE 115-*i* may determine a first open loop power control parameter for a first subset of the set of transmission occasions based at least in part on a joint parameter field and an absence of a resource field in the control message and determine a second open loo power control parameter for a second subset of the set of transmission occasions based at least in part on the joint parameter field and the absence of the resource field in the control message.

At 615, UE 115-*i* may determine respective transmit powers for each transmission occasion of the set of transmission occasions based at least in part on the power boost configuration. In some examples, power boosting may be applied to both a first subset of the set of transmission occasions and a second subset of the set of transmission occasions. In some examples, UE 115-*i* may determine a first set of uplink power control parameters for a first subset of the set of transmission occasions based at least in part on a first parameter field and a first resource field included in the control message, wherein the first resource field corresponds to the first subset of the set of transmission occasions. In some examples, UE 115-*i* may determine a second set of uplink power control parameters for a second subset of the set of transmission occasions based at least in part on a second parameter field and a second resource field included in the control message, where the second resource field corresponds to the second subset of the set of transmission occasions. In some examples, UE 115-*i* may receive a second control message before receiving the control message where the second control message indicates the presence of the second parameter field.

At 620, UE 115-*i* may transmit the one or more uplink messages via the set of transmission occasions in accordance with the respective transmit powers.

Figure 7:
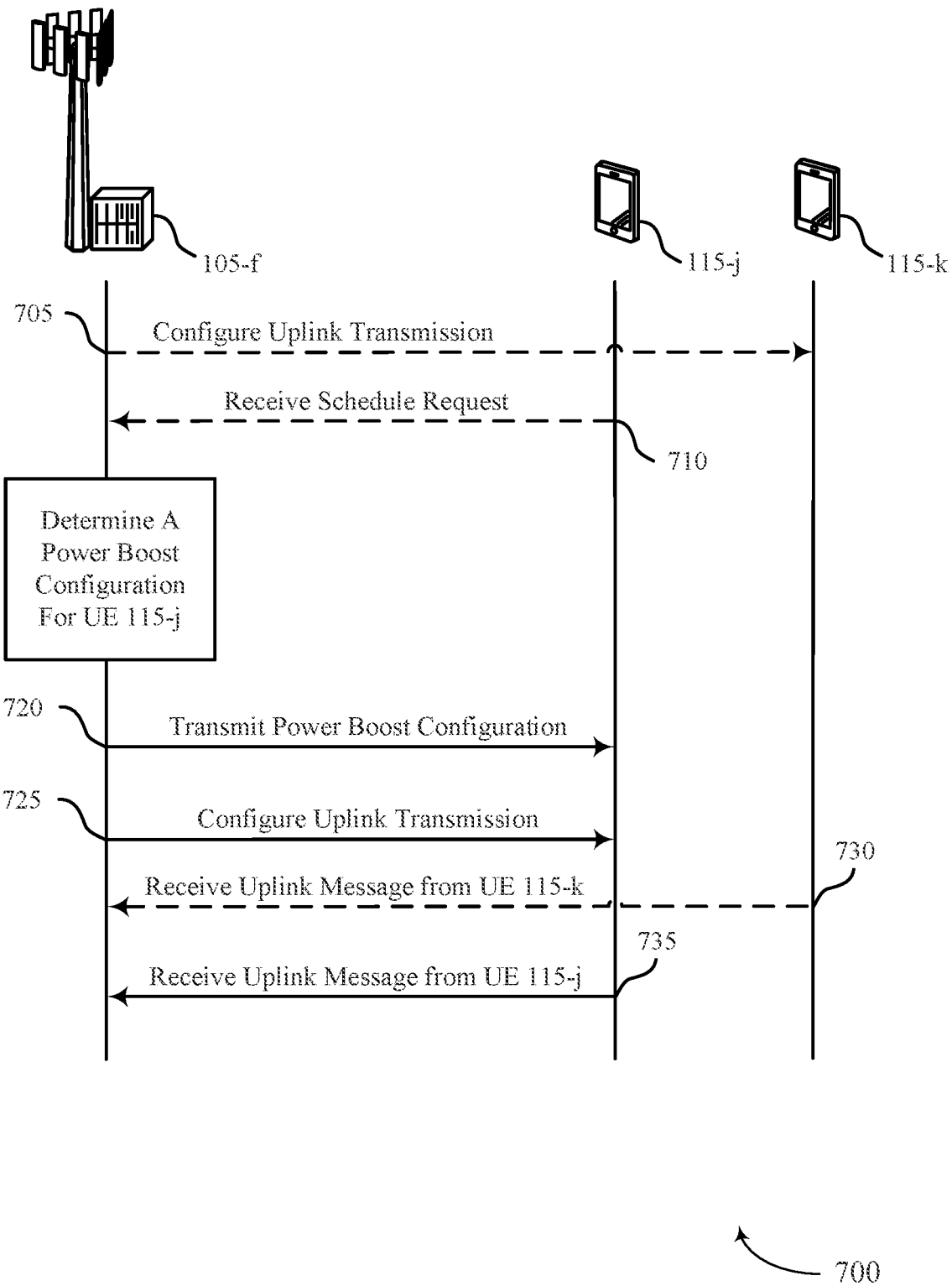
FIG. 7 illustrates an example of a process flow that supports power boosting for uplink shared channel repetitions in accordance with aspects of the present disclosure.

FIG. 7 illustrates an example of a process flow 700 that supports power boosting for uplink shared channel repetitions in accordance with aspects of the present disclosure. In some examples, process flow 700 may implement aspects of wireless communication system 100. Process flow 700 may include a base station 105-*f*, a UE 115-*j*, and a UE 115-*k*, which may be examples of corresponding base stations 105 and UEs 115, as described above with reference to FIGS. 1-5. In the following description of the process flow 700, the operations between UE 115-*j*, UE 115-*k*, and base station 105-*f* may be transmitted in a different order than the order shown, or the operations performed by base station 105-*f*, UE 115-*j*, and UE 115-*k* may be performed in different orders or at different times. Certain operations may also be left out of the process flow 700, or other operations may be added to the process flow 700. It is to be understood that while base station 105-*f*, UE 115-*j*, and UE 115-*k* are shown performing a number of the operations of process flow 700, any wireless device may perform the operations shown.

At 705, base station 105-*f* may transmit a configuration for an uplink transmission to UE 115-*k*. In some cases, this uplink configuration may include a configuring time and frequency resources for an uplink transmission. The uplink configuration may also include transmission parameters such as but not limited to transmission power.

At 710, base station 105-*f* may receive a schedule request from UE 115-*j*. In some cases, UE 115-*j* may request resources to transmit a higher priority message, such as a URLLC transmission. In some cases, UE 115-*j* may request resources allocated to UE 115-*k* at 705. In some cases, the schedule request may go to a different base station in the network than base station 105-*f*.

At 715, base station 105-*f* may determine a power boost configuration for UE 115-*j*.

At 720, base station 105-*f* may transmit an indication of the power boost configuration to the UE, where the power boost configuration indicates which of a set of transmission occasions that the UE is to apply power boosting. In some examples, transmitting the power boost may include transmitting an indication of the power boost configuration in the control message that schedules transmission of one or more uplink messages, where the control message comprises DCI. In some examples, base station 105-*f* may transmit the indication of the power boost configuration a second control message comprising the indication of the power boost configuration.

At 725, base station 105-*f* may transmit a control message that schedules transmission of one or more uplink messages via the set of transmission occasions. In some examples, base station 105-*f* may transmit a parameter field and a resource field in the control message wherein the parameter field and the resource field indicate which of the set of transmission occasions that the UE is to apply power boosting.

At 730, base station 105-*f* may receive the one or more uplink messages from UE 115-*k* configured at 705.

At 735, base station 105-*f* may receive the one or more uplink messages from UE 115-*j* via the set of transmission occasions configured at 725 in accordance with a transmit power based at least in part on the power boost configuration configured at 720.

Figure 8:
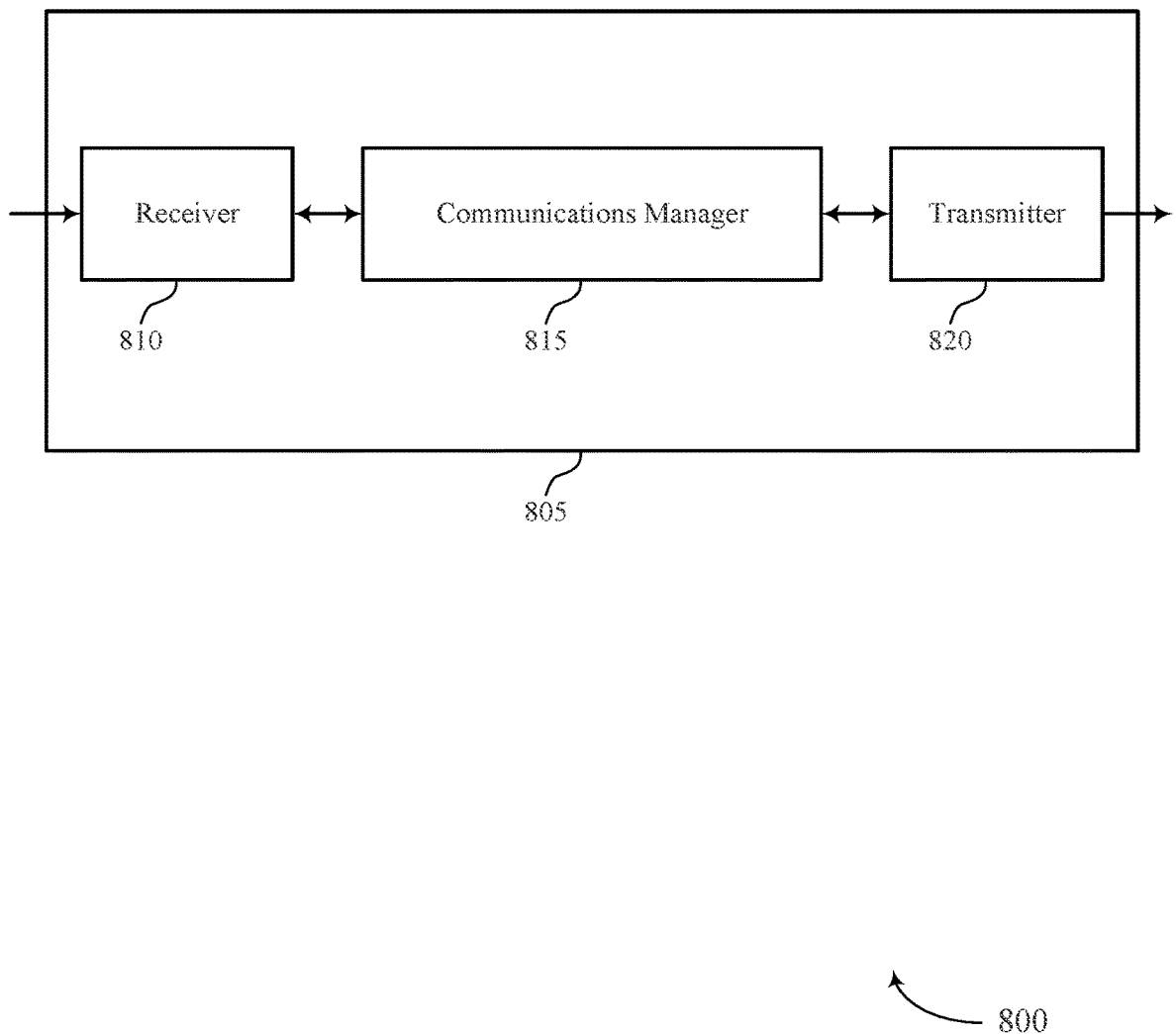
FIGS. 8 and 9 show block diagrams of devices that support power boosting for uplink shared channel repetitions in accordance with aspects of the present disclosure.

FIG. 8 shows a block diagram 800 of a device 805 that supports power boosting for uplink shared channel repetitions in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to power boosting for uplink shared channel repetitions, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may receive, from a base station, a control message that schedules a set of transmission occasions for one or more uplink messages for the UE, determine a power boost configuration for the UE, the power boost configuration indicating which of the set of transmission occasions to apply power boosting, determine respective transmit powers for each transmission occasion of the set of transmission occasions based on the power boost configuration, and transmit the one or more uplink messages via the set of transmission occasions in accordance with the respective transmit powers. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

In some examples, the communications manager 815 may be implemented as an integrated circuit or chipset for a mobile device modem, and the receiver 810 and transmitter 820 may be implemented as analog components (e.g., amplifiers, filters, antennas) coupled with the mobile device modem to enable wireless transmission and reception over one or more bands.

The communications manager 815 as described herein may be implemented to realize one or more potential advantages. One implementation may enable the device 805 to separately control power for different transmission occasions. Such techniques may allow for flexible transmit powers to be used for multiple transmissions, such as PUSCH transmissions, which may be directed toward different TRPs or base stations. Based on the power control techniques between the device 805 and the network, the device 805 may efficiently utilize time-frequency resources used for uplink transmissions and resources of the device 805.

As such, the device 805 may increase the likelihood of successful uplink transmissions by reducing potential interference at a base station or TRP, and may in some cases, reduce the transmit power used for some transmission occasions, which may enable the device 805 to more efficiently manage network resources and transmit power at the device 805. In some examples, based on a greater likelihood of successful communications and more flexible power control, the device 805 may more efficiently power a processor or one or more processing units associated with power control and uplink transmissions, which may enable the device 805 to save power and increase battery life.

Figure 9:
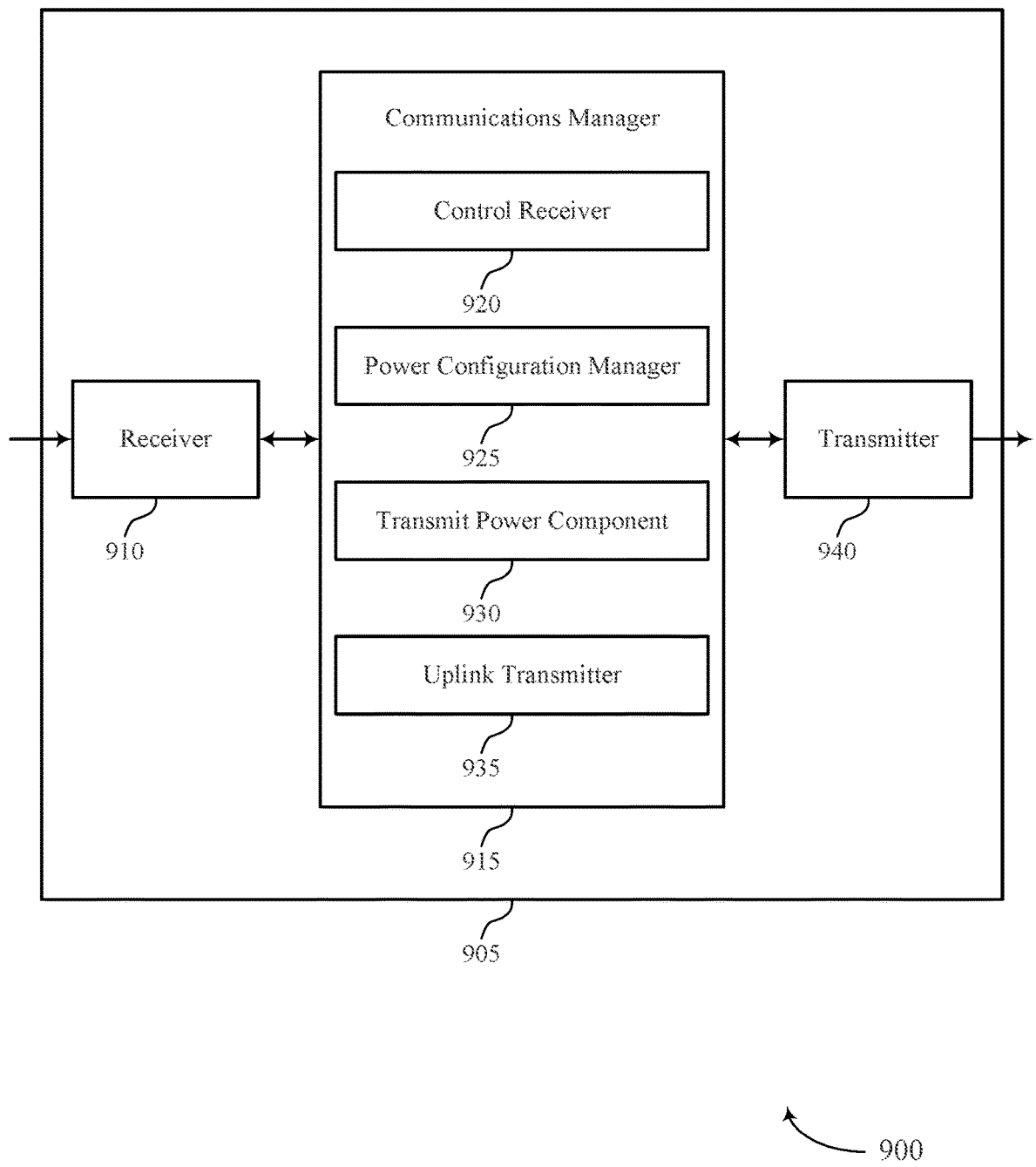

FIG. 9 shows a block diagram 900 of a device 905 that supports power boosting for uplink shared channel repetitions in accordance with aspects of the present disclosure. The device 905 may be an example of aspects of a device 805, or a UE 115 as described herein. The device 905 may include a receiver 910, a communications manager 915, and a transmitter 940. The device 905 may also include a processor. Each of these components may be in communication with one another (e.g., via one or more buses).

The receiver 910 may receive information such as packets, user data, or control information associated with various information channels (e.g., control channels, data channels, and information related to power boosting for uplink shared channel repetitions, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a control receiver 920, a power configuration manager 925, a transmit power component 930, and an uplink transmitter 935. The communications manager 915 may be an example of aspects of the communications manager 1110 described herein.

The control receiver 920 may receive, from a base station, a control message that schedules a set of transmission occasions for one or more uplink messages for the UE.

The power configuration manager 925 may determine a power boost configuration for the UE, the power boost configuration indicating which of the set of transmission occasions to apply power boosting.

The transmit power component 930 may determine respective transmit powers for each transmission occasion of the set of transmission occasions based on the power boost configuration.

The uplink transmitter 935 may transmit the one or more uplink messages via the set of transmission occasions in accordance with the respective transmit powers.

The transmitter 940 may transmit signals generated by other components of the device 905. In some examples, the transmitter 940 may be collocated with a receiver 910 in a transceiver module. For example, the transmitter 940 may be an example of aspects of the transceiver 1120 described with reference to FIG. 11. The transmitter 940 may utilize a single antenna or a set of antennas.

Figure 10:
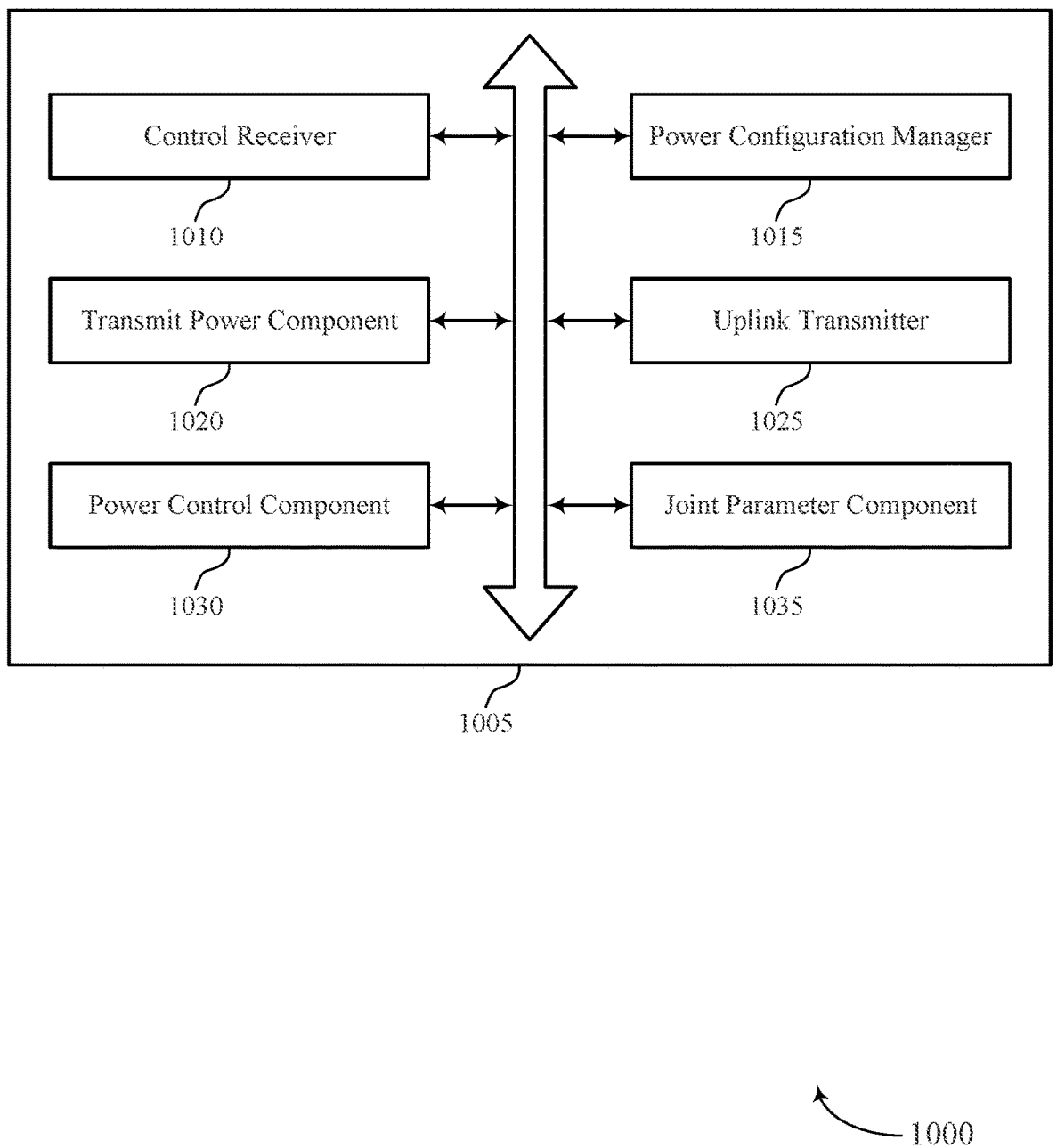
FIG. 10 shows a block diagram of a communications manager that supports power boosting for uplink shared channel repetitions in accordance with aspects of the present disclosure.

FIG. 10 shows a block diagram 1000 of a communications manager 1005 that supports power boosting for uplink shared channel repetitions in accordance with aspects of the present disclosure. The communications manager 1005 may be an example of aspects of a communications manager 815, a communications manager 915, or a communications manager 1110 described herein. The communications manager 1005 may include a control receiver 1010, a power configuration manager 1015, a transmit power component 1020, an uplink transmitter 1025, a power control component 1030, and a joint parameter component 1035. Each of these modules may communicate, directly or indirectly, with one another (e.g., via one or more buses).

The control receiver 1010 may receive, from a base station, a control message that schedules a set of transmission occasions for one or more uplink messages for the UE.

In some examples, the control receiver 1010 may receive a second control message before receiving the control message, where the second control message indicates the presence of the second parameter field.

In some examples, receiving a second control message before receiving the control message, where the second control message includes the power boost configuration indicating which of the set of transmission occasions to apply power boosting.

In some examples, the control receiver 1010 may receive the second control message via RRC signaling.

The power configuration manager 1015 may determine a power boost configuration for the UE, the power boost configuration indicating which of the set of transmission occasions to apply power boosting.

In some examples, determining the power boost configuration based on the control message, where the control message includes a field that indicates which of the set of transmission occasions to apply power boosting.

The transmit power component 1020 may determine respective transmit powers for each transmission occasion of the set of transmission occasions based on the power boost configuration.

In some examples, the transmit power component 1020 may determine a first transmit power for a first subset of the set of transmission occasions based on the power boost configuration.

In some examples, the transmit power component 1020 may determine a second transmit power for a second subset of the set of transmission occasions based on the power boost configuration.

In some examples, the transmit power component 1020 may determine the first and second transmit powers to be the same based on the power boost configuration indicating both the first and second subsets of the set of transmission occasions for applying power boosting.

The uplink transmitter 1025 may transmit the one or more uplink messages via the set of transmission occasions in accordance with the respective transmit powers.

In some examples, the uplink transmitter 1025 may transmit a first uplink message via the first subset of the set of transmission occasions based on the first set of uplink power control parameters.

In some examples, the uplink transmitter 1025 may transmit a second uplink message via the second subset of the set of transmission occasions based on the second set of uplink power control parameters.

The power control component 1030 may determine a first set of uplink power control parameters for the first subset of the set of transmission occasions based on a first parameter field in the control message.

In some examples, the power control component 1030 may determine a second set of uplink power control parameters for the second subset of the set of transmission occasions based on a second parameter field in the control message.

In some examples, the power control component 1030 may determine a first set of uplink power control parameters for a first subset of the set of transmission occasions based on a first set of bits of a parameter field in the control message.

In some examples, the power control component 1030 may determine a second set of uplink power control parameters for a second subset of the set of transmission occasions based on a second set of bits of the parameter field in the control message.

In some examples, the power control component 1030 may determine a first set of uplink power control parameters for a first subset of the set of transmission occasions based on a first parameter field and a first resource field included in the control message, where the first resource field corresponds to the first subset of the set of transmission occasions.

In some examples, the power control component 1030 may determine a second set of uplink power control parameters for a second subset of the set of transmission occasions based on a second parameter field and a second resource field included in the control message, where the second resource field corresponds to the second subset of the set of transmission occasions.

In some examples, the power control component 1030 may determine a first set of uplink power control parameters for a first subset of the set of transmission occasions based on the power boost configuration.

In some examples, the power control component 1030 may determine a second set of uplink power control parameters for a second subset of the set of transmission occasions based on the power boost configuration.

The joint parameter component 1035 may determine a first open loop power control parameter for a first subset of the set of transmission occasions based on the control message including a joint parameter field and a joint resource field indicating a first value of a pair of values for open loop power control for the first subset of the set of transmission occasions.

In some examples, the joint parameter component 1035 may determine a second open loop power control parameter for a second subset of the set of transmission occasions based on the control message including the joint parameter field and the joint resource field indicating a second value of the pair of values for open loop power control for the second subset of the set of transmission occasions.

In some examples, the joint parameter component 1035 may determine a first open loop power control parameter for a first subset of the set of transmission occasions based on a joint parameter field and an absence of a resource field in the control message.

In some examples, the joint parameter component 1035 may determine a second open loop power control parameter for a second subset of the set of transmission occasions based on the joint parameter field and the absence of the resource field in the control message.

Figure 11:
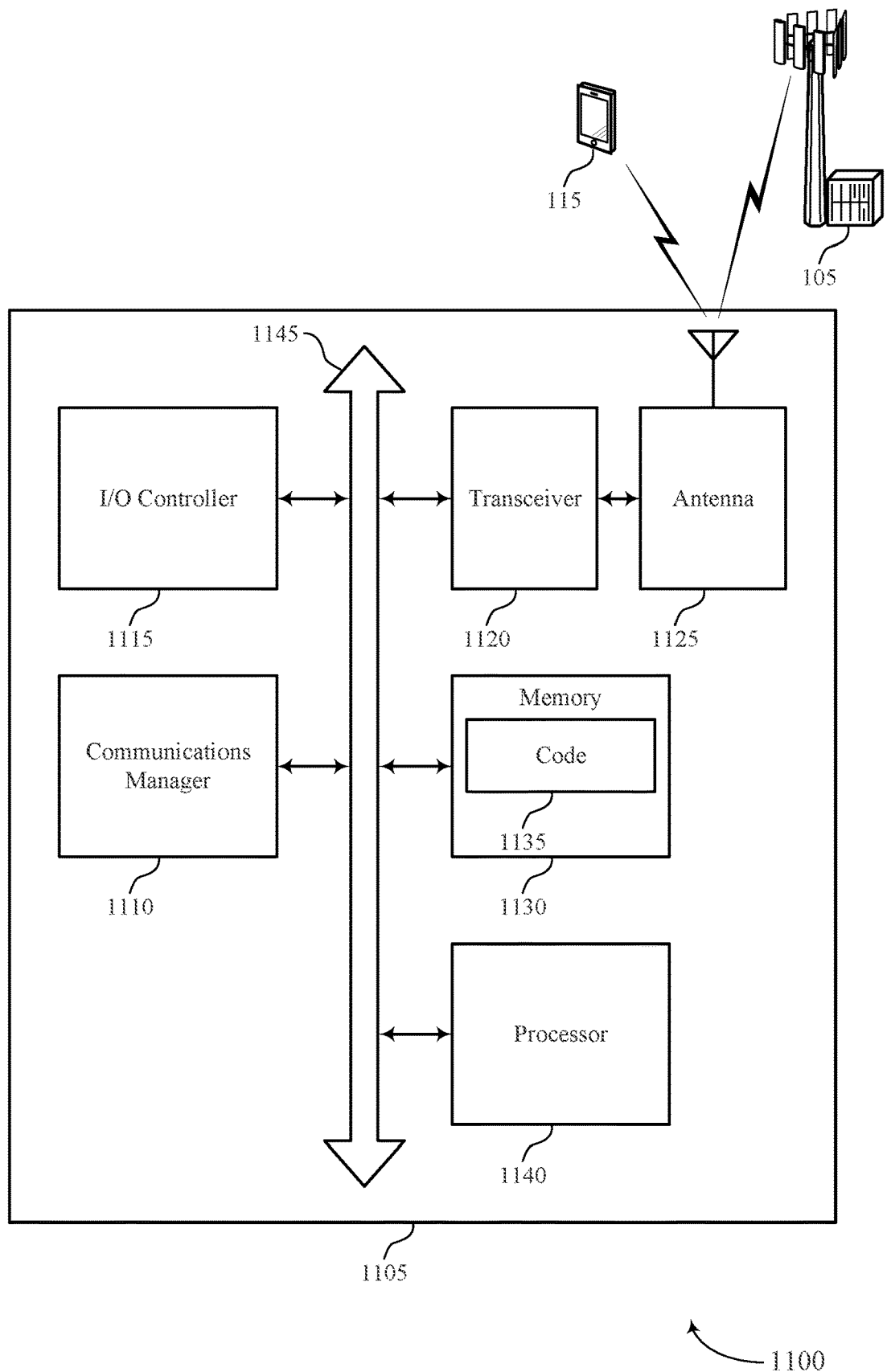
FIG. 11 shows a diagram of a system including a device that supports power boosting for uplink shared channel repetitions in accordance with aspects of the present disclosure.

FIG. 11 shows a diagram of a system 1100 including a device 1105 that supports power boosting for uplink shared channel repetitions in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may receive, from a base station, a control message that schedules a set of transmission occasions for one or more uplink messages for the UE, determine a power boost configuration for the UE, the power boost configuration indicating which of the set of transmission occasions to apply power boosting, determine respective transmit powers for each transmission occasion of the set of transmission occasions based on the power boost configuration, and transmit the one or more uplink messages via the set of transmission occasions in accordance with the respective transmit powers.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM and ROM. The memory 1130 may store computer-readable, computer-executable code 1135 including instructions that, when executed, cause the processor to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting power boosting for uplink shared channel repetitions).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
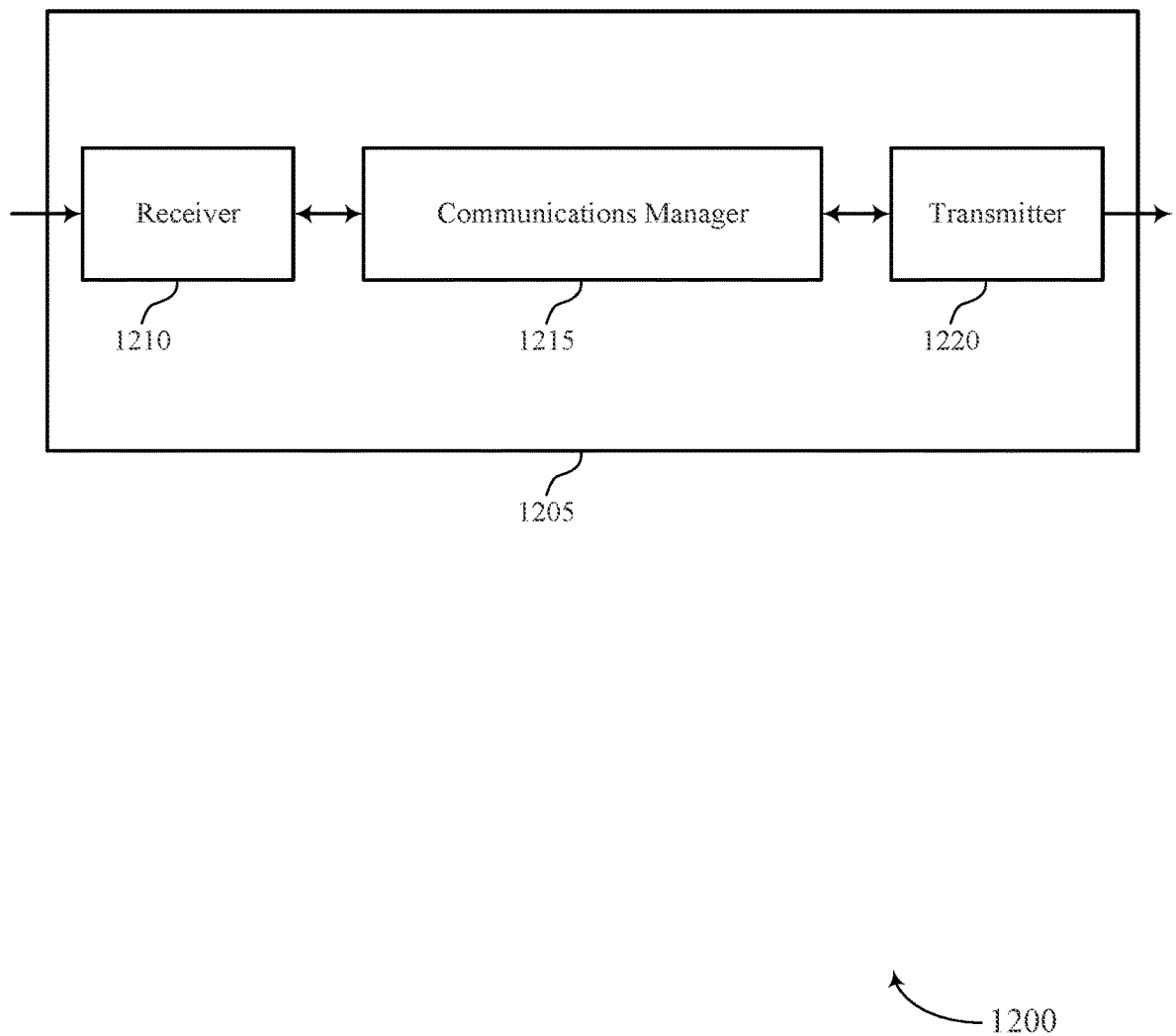
FIGS. 12 and 13 show block diagrams of devices that support power boosting for uplink shared channel repetitions in accordance with aspects of the present disclosure.

FIG. 12 shows a block diagram 1200 of a device 1205 that supports power boosting for uplink shared channel repetitions in accordance with aspects of the present disclosure. The device 1205 may be an example of aspects of a base station 105 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to power boosting for uplink shared channel repetitions, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may determine a power boost configuration for a UE in communication with the UE, transmit an indication of the power boost configuration to the UE, where the power boost configuration indicates which of a set of transmission occasions that the UE is to apply power boosting, transmit a control message that schedules transmission of one or more uplink messages via the set of transmission occasions, and receive the one or more uplink messages via the set of transmission occasions in accordance with a transmit power based on the power boost configuration. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
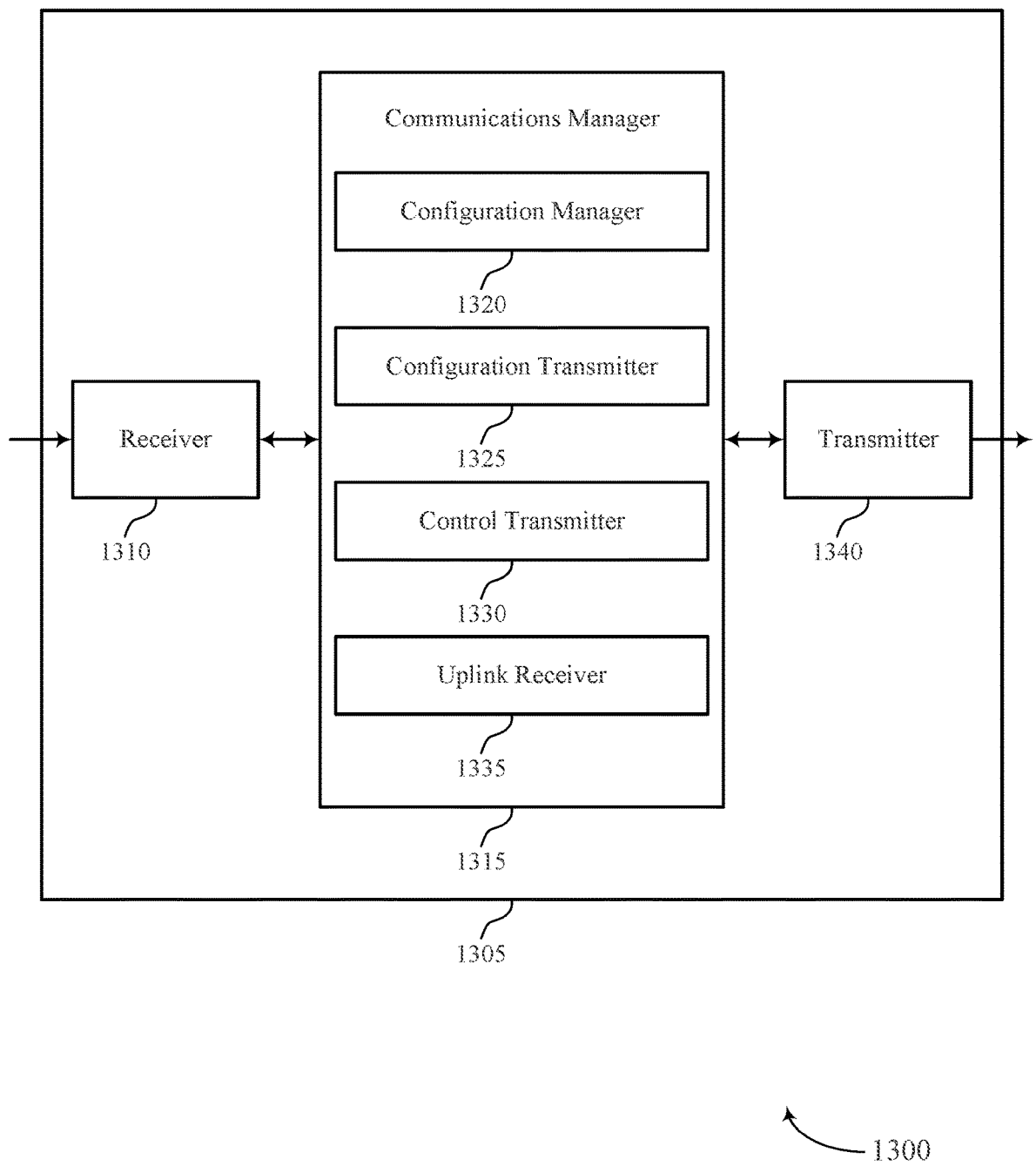

FIG. 13 shows a block diagram 1300 of a device 1305 that supports power boosting for uplink shared channel repetitions in accordance with aspects of the present disclosure. The device 1305 may be an example of aspects of a device 1205, or a base station 105 as described herein. The device 1305 may include a receiver 1310, a communications manager 1315, and a transmitter 1340. The device 1305 may also include a processor. Each of these components may be in communication with one another (e.g., via one or more buses).

The receiver 1310 may receive information such as packets, user data, or control information associated with various information channels (e.g., control channels, data channels, and information related to power boosting for uplink shared channel repetitions, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a configuration manager 1320, a configuration transmitter 1325, a control transmitter 1330, and an uplink receiver 1335. The communications manager 1315 may be an example of aspects of the communications manager 1510 described herein.

The configuration manager 1320 may determine a power boost configuration for a UE in communication with the UE.

The configuration transmitter 1325 may transmit an indication of the power boost configuration to the UE, where the power boost configuration indicates which of a set of transmission occasions that the UE is to apply power boosting.

The control transmitter 1330 may transmit a control message that schedules transmission of one or more uplink messages via the set of transmission occasions.

The uplink receiver 1335 may receive the one or more uplink messages via the set of transmission occasions in accordance with a transmit power based on the power boost configuration.

The transmitter 1340 may transmit signals generated by other components of the device 1305. In some examples, the transmitter 1340 may be collocated with a receiver 1310 in a transceiver module. For example, the transmitter 1340 may be an example of aspects of the transceiver 1520 described with reference to FIG. 15. The transmitter 1340 may utilize a single antenna or a set of antennas.

Figure 14:
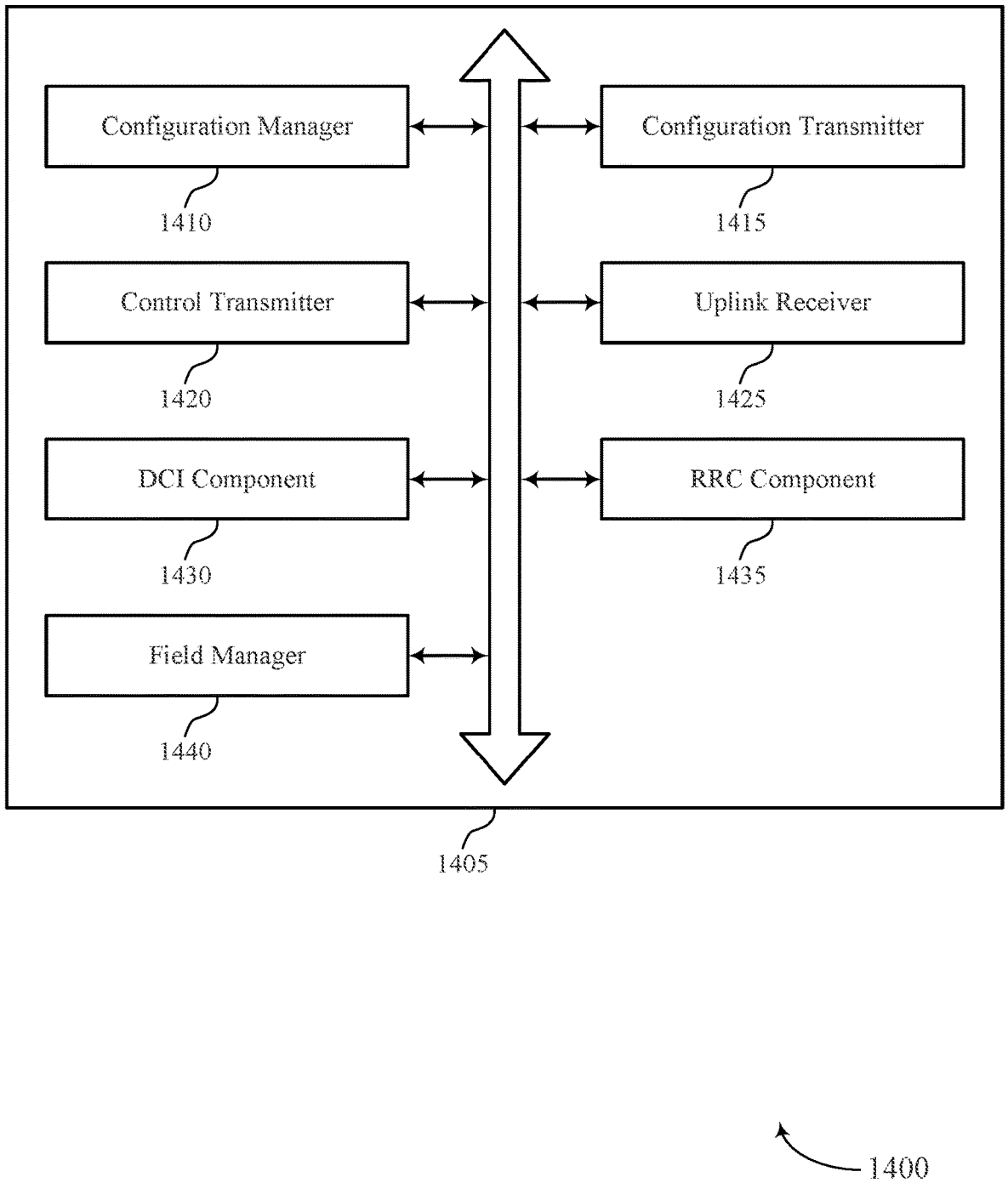
FIG. 14 shows a block diagram of a communications manager that supports power boosting for uplink shared channel repetitions in accordance with aspects of the present disclosure.

FIG. 14 shows a block diagram 1400 of a communications manager 1405 that supports power boosting for uplink shared channel repetitions in accordance with aspects of the present disclosure. The communications manager 1405 may be an example of aspects of a communications manager 1215, a communications manager 1315, or a communications manager 1510 described herein. The communications manager 1405 may include a configuration manager 1410, a configuration transmitter 1415, a control transmitter 1420, an uplink receiver 1425, a DCI component 1430, a RRC component 1435, and a field manager 1440. Each of these modules may communicate, directly or indirectly, with one another (e.g., via one or more buses).

The configuration manager 1410 may determine a power boost configuration for a UE in communication with the UE.

The configuration transmitter 1415 may transmit an indication of the power boost configuration to the UE, where the power boost configuration indicates which of a set of transmission occasions that the UE is to apply power boosting.

The control transmitter 1420 may transmit a control message that schedules transmission of one or more uplink messages via the set of transmission occasions.

The uplink receiver 1425 may receive the one or more uplink messages via the set of transmission occasions in accordance with a transmit power based on the power boost configuration.

The DCI component 1430 may include the indication of the power boost configuration in the control message that schedules transmission of one or more uplink messages, where the control message includes DCI.

The RRC component 1435 may transmit, via RRC signaling, a second control message including the indication of the power boost configuration.

The field manager 1440 may transmit a parameter field and a resource field in the control message, where the parameter field and the resource field indicate which of the set of transmission occasions that the UE is to apply power boosting.

Figure 15:
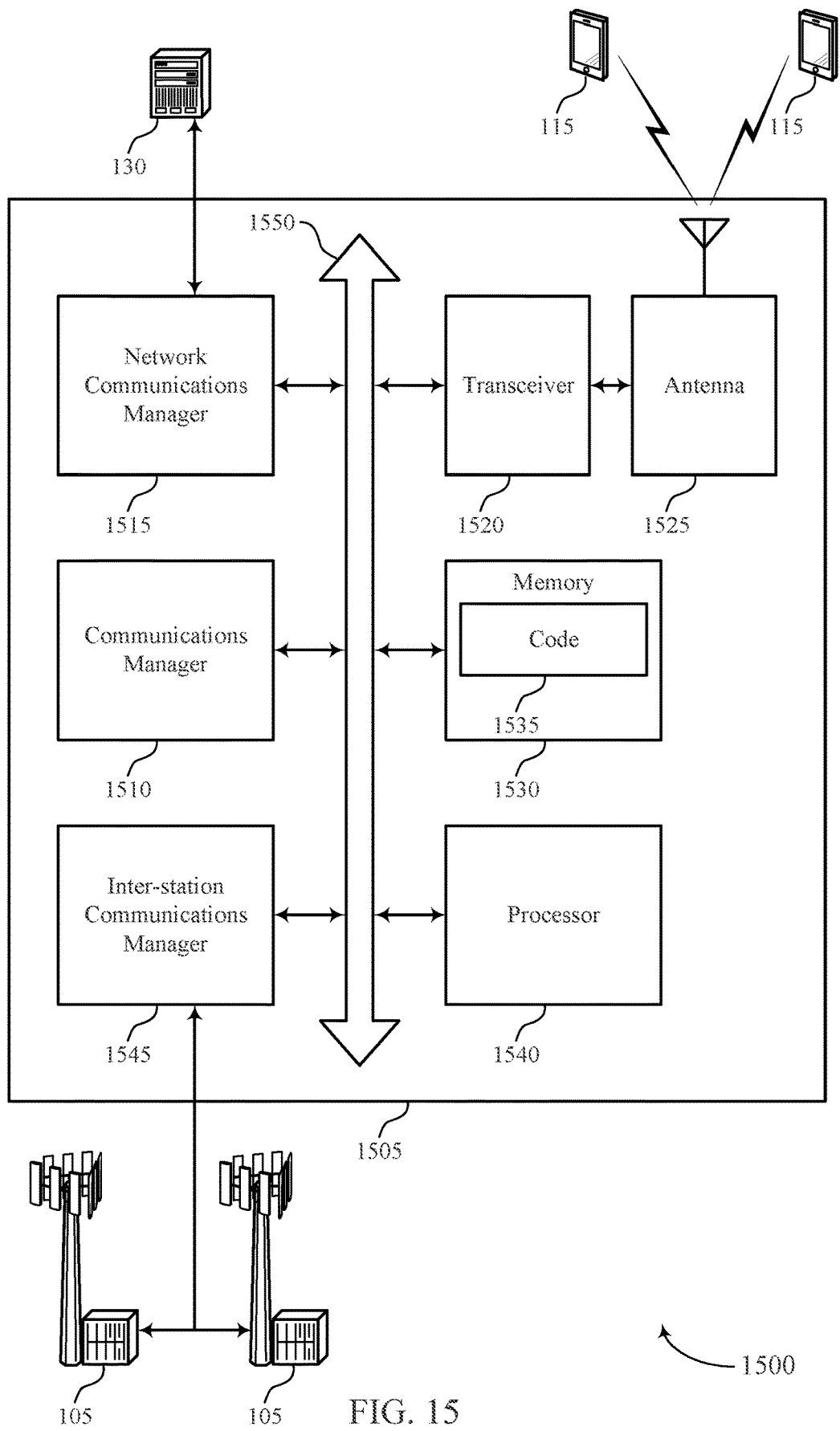
FIG. 15 shows a diagram of a system including a device that supports power boosting for uplink shared channel repetitions in accordance with aspects of the present disclosure.

FIG. 15 shows a diagram of a system 1500 including a device 1505 that supports power boosting for uplink shared channel repetitions in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The communications manager 1510 may determine a power boost configuration for a UE in communication with the UE, transmit an indication of the power boost configuration to the UE, where the power boost configuration indicates which of a set of transmission occasions that the UE is to apply power boosting, transmit a control message that schedules transmission of one or more uplink messages via the set of transmission occasions, and receive the one or more uplink messages via the set of transmission occasions in accordance with a transmit power based on the power boost configuration.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting power boosting for uplink shared channel repetitions).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
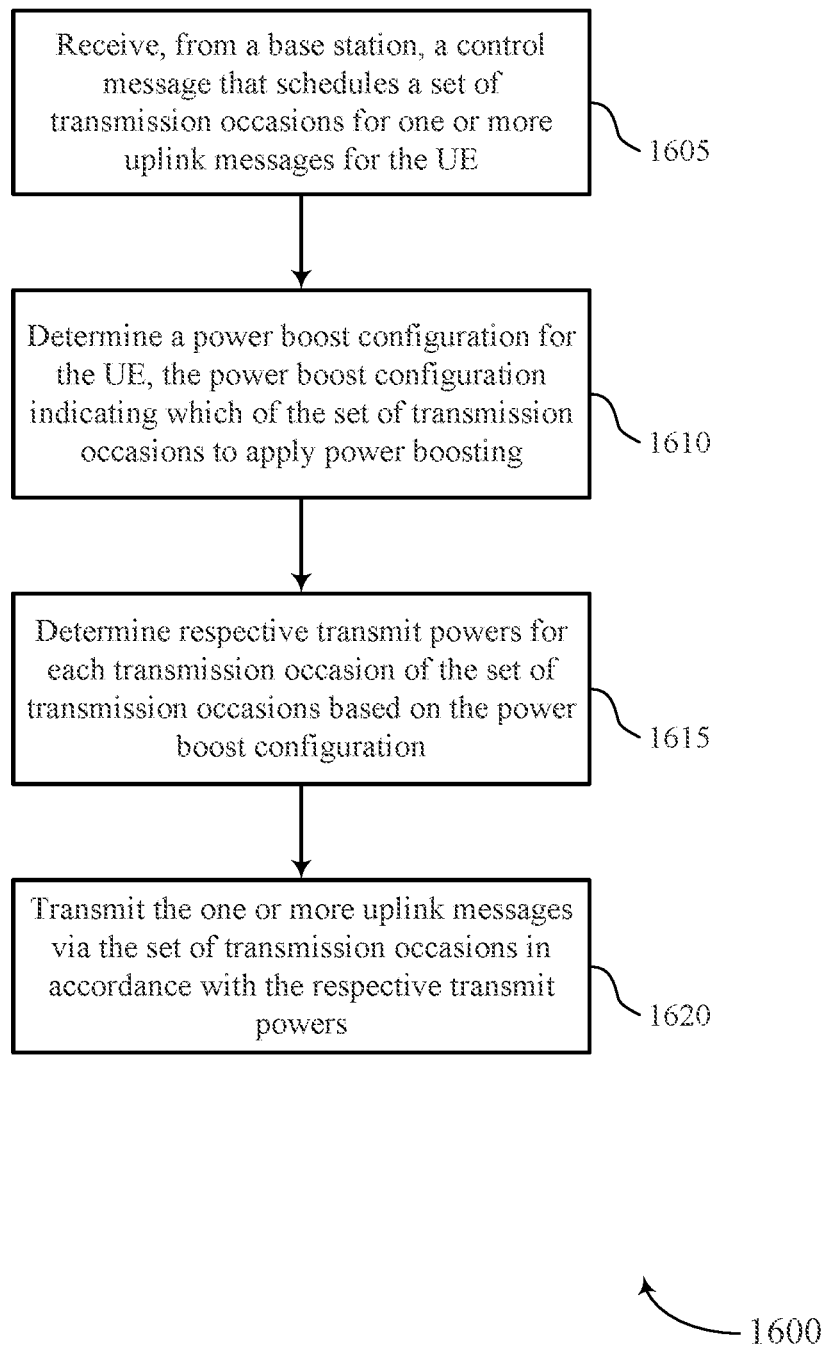
FIGS. 16 through 21 show flowcharts illustrating methods that support power boosting for uplink shared channel repetitions in accordance with aspects of the present disclosure.

FIG. 16 shows a flowchart illustrating a method 1600 that supports power boosting for uplink shared channel repetitions in accordance with aspects of the present disclosure. The operations of method 1600 may be implemented by a UE 115 or its components as described herein. For example, the operations of method 1600 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1605, the UE may receive, from a base station, a control message that schedules a set of transmission occasions for one or more uplink messages for the UE. The operations of 1605 may be performed according to the methods described herein. In some examples, aspects of the operations of 1605 may be performed by a control receiver as described with reference to FIGS. 8 through 11.

At 1610, the UE may determine a power boost configuration for the UE, the power boost configuration indicating which of the set of transmission occasions to apply power boosting. The operations of 1610 may be performed according to the methods described herein. In some examples, aspects of the operations of 1610 may be performed by a power configuration manager as described with reference to FIGS. 8 through 11.

At 1615, the UE may determine respective transmit powers for each transmission occasion of the set of transmission occasions based on the power boost configuration. The operations of 1615 may be performed according to the methods described herein. In some examples, aspects of the operations of 1615 may be performed by a transmit power component as described with reference to FIGS. 8 through 11.

At 1620, the UE may transmit the one or more uplink messages via the set of transmission occasions in accordance with the respective transmit powers. The operations of 1620 may be performed according to the methods described herein. In some examples, aspects of the operations of 1620 may be performed by an uplink transmitter as described with reference to FIGS. 8 through 11.

Figure 17:
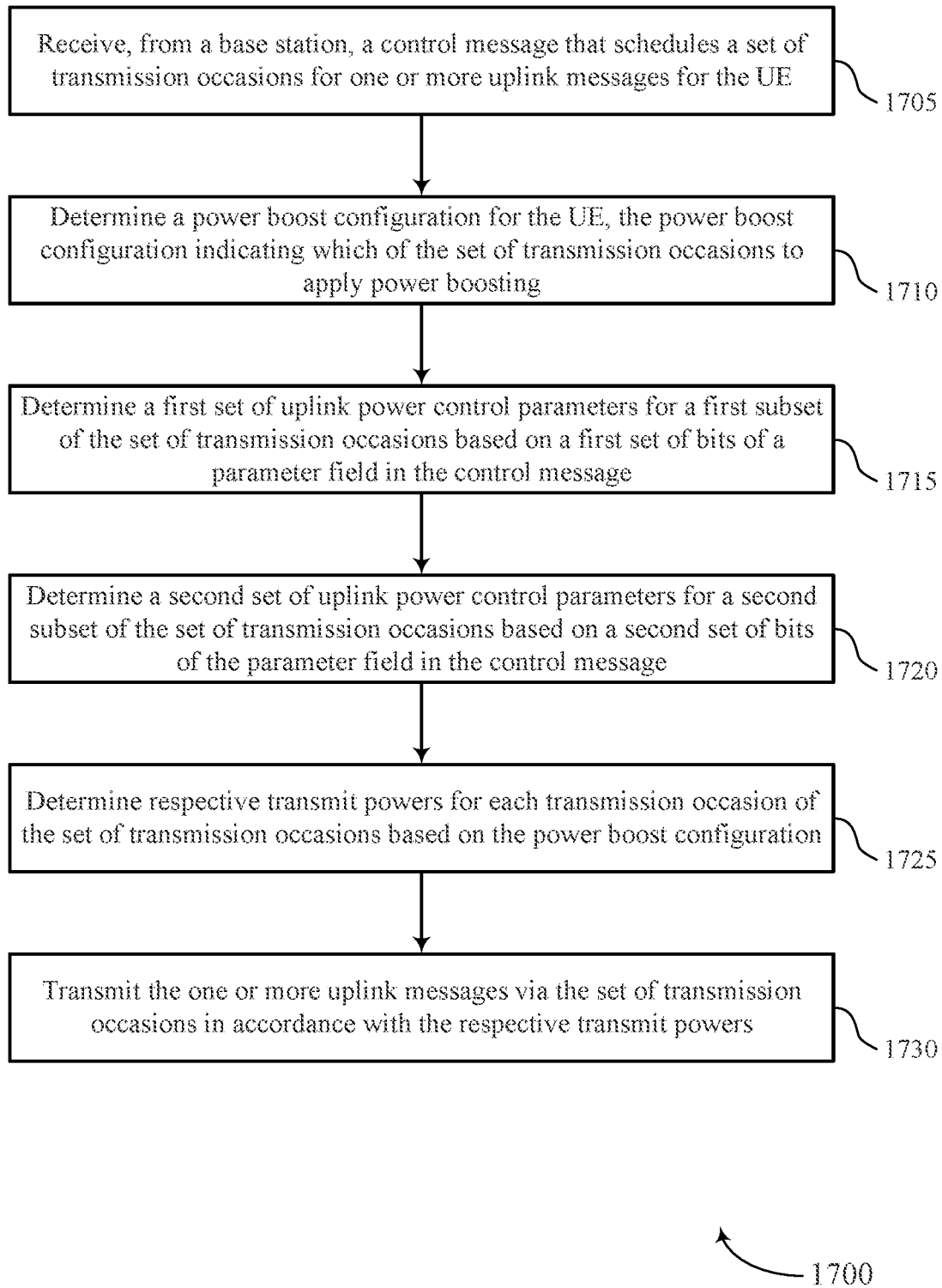

FIG. 17 shows a flowchart illustrating a method 1700 that supports power boosting for uplink shared channel repetitions in accordance with aspects of the present disclosure. The operations of method 1700 may be implemented by a UE 115 or its components as described herein. For example, the operations of method 1700 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1705, the UE may receive, from a base station, a control message that schedules a set of transmission occasions for one or more uplink messages for the UE. The operations of 1705 may be performed according to the methods described herein. In some examples, aspects of the operations of 1705 may be performed by a control receiver as described with reference to FIGS. 8 through 11.

At 1710, the UE may determine a power boost configuration for the UE, the power boost configuration indicating which of the set of transmission occasions to apply power boosting. The operations of 1710 may be performed according to the methods described herein. In some examples, aspects of the operations of 1710 may be performed by a power configuration manager as described with reference to FIGS. 8 through 11.

At 1715, the UE may determine a first set of uplink power control parameters for a first subset of the set of transmission occasions based on a first set of bits of a parameter field in the control message. The operations of 1715 may be performed according to the methods described herein. In some examples, aspects of the operations of 1715 may be performed by a power control component as described with reference to FIGS. 8 through 11.

At 1720, the UE may determine a second set of uplink power control parameters for a second subset of the set of transmission occasions based on a second set of bits of the parameter field in the control message. The operations of 1720 may be performed according to the methods described herein. In some examples, aspects of the operations of 1720 may be performed by a power control component as described with reference to FIGS. 8 through 11.

At 1725, the UE may determine respective transmit powers for each transmission occasion of the set of transmission occasions based on the power boost configuration. The operations of 1725 may be performed according to the methods described herein. In some examples, aspects of the operations of 1725 may be performed by a transmit power component as described with reference to FIGS. 8 through 11.

At 1730, the UE may transmit the one or more uplink messages via the set of transmission occasions in accordance with the respective transmit powers. The operations of 1730 may be performed according to the methods described herein. In some examples, aspects of the operations of 1730 may be performed by an uplink transmitter as described with reference to FIGS. 8 through 11.

Figure 18:
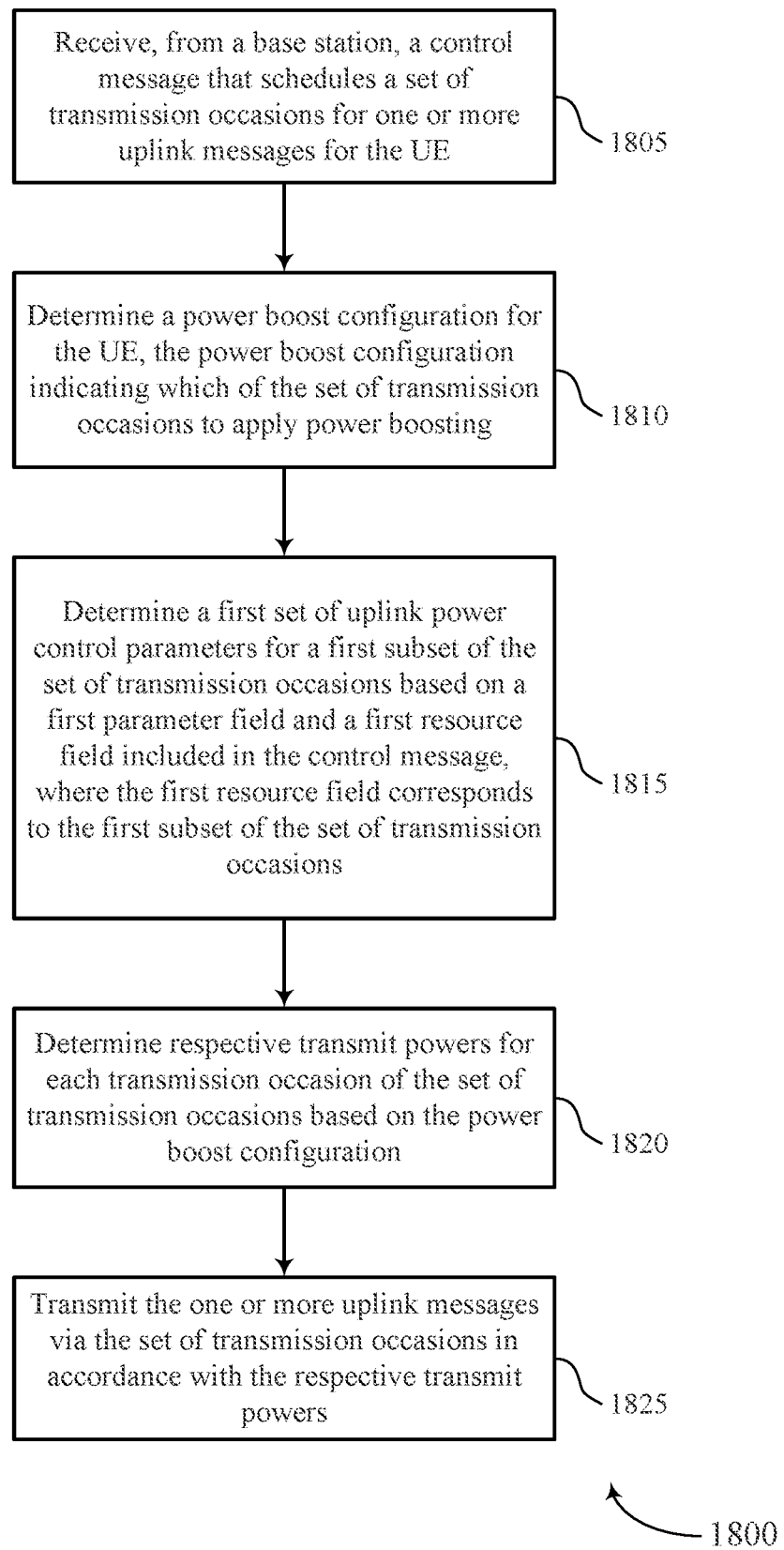

FIG. 18 shows a flowchart illustrating a method 1800 that supports power boosting for uplink shared channel repetitions in accordance with aspects of the present disclosure. The operations of method 1800 may be implemented by a UE 115 or its components as described herein. For example, the operations of method 1800 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1805, the UE may receive, from a base station, a control message that schedules a set of transmission occasions for one or more uplink messages for the UE. The operations of 1805 may be performed according to the methods described herein. In some examples, aspects of the operations of 1805 may be performed by a control receiver as described with reference to FIGS. 8 through 11.

At 1810, the UE may determine a power boost configuration for the UE, the power boost configuration indicating which of the set of transmission occasions to apply power boosting. The operations of 1810 may be performed according to the methods described herein. In some examples, aspects of the operations of 1810 may be performed by a power configuration manager as described with reference to FIGS. 8 through 11.

At 1815, the UE may determine a first set of uplink power control parameters for a first subset of the set of transmission occasions based on a first parameter field and a first resource field included in the control message, where the first resource field corresponds to the first subset of the set of transmission occasions. The operations of 1815 may be performed according to the methods described herein. In some examples, aspects of the operations of 1815 may be performed by a power control component as described with reference to FIGS. 8 through 11.

At 1820, the UE may determine respective transmit powers for each transmission occasion of the set of transmission occasions based on the power boost configuration. The operations of 1820 may be performed according to the methods described herein. In some examples, aspects of the operations of 1820 may be performed by a transmit power component as described with reference to FIGS. 8 through 11.

At 1825, the UE may transmit the one or more uplink messages via the set of transmission occasions in accordance with the respective transmit powers. The operations of 1825 may be performed according to the methods described herein. In some examples, aspects of the operations of 1825 may be performed by an uplink transmitter as described with reference to FIGS. 8 through 11.

Figure 19:
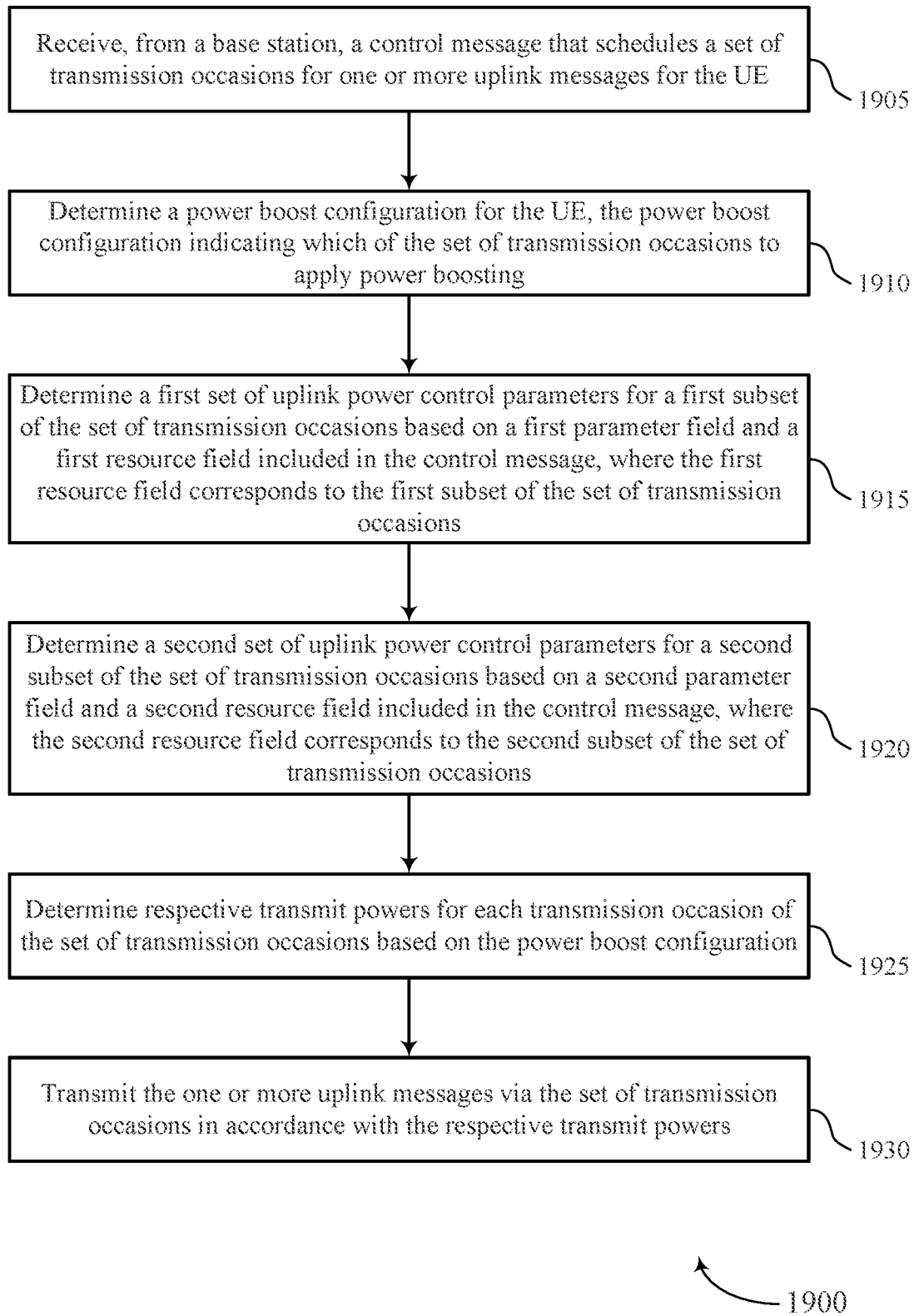

FIG. 19 shows a flowchart illustrating a method 1900 that supports power boosting for uplink shared channel repetitions in accordance with aspects of the present disclosure. The operations of method 1900 may be implemented by a UE 115 or its components as described herein. For example, the operations of method 1900 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1905, the UE may receive, from a base station, a control message that schedules a set of transmission occasions for one or more uplink messages for the UE. The operations of 1905 may be performed according to the methods described herein. In some examples, aspects of the operations of 1905 may be performed by a control receiver as described with reference to FIGS. 8 through 11.

At 1910, the UE may determine a power boost configuration for the UE, the power boost configuration indicating which of the set of transmission occasions to apply power boosting. The operations of 1910 may be performed according to the methods described herein. In some examples, aspects of the operations of 1910 may be performed by a power configuration manager as described with reference to FIGS. 8 through 11.

At 1915, the UE may determine a first set of uplink power control parameters for a first subset of the set of transmission occasions based on a first parameter field and a first resource field included in the control message, where the first resource field corresponds to the first subset of the set of transmission occasions. The operations of 1915 may be performed according to the methods described herein. In some examples, aspects of the operations of 1915 may be performed by a power control component as described with reference to FIGS. 8 through 11.

At 1920, the UE may determine a second set of uplink power control parameters for a second subset of the set of transmission occasions based on a second parameter field and a second resource field included in the control message, where the second resource field corresponds to the second subset of the set of transmission occasions. The operations of 1920 may be performed according to the methods described herein. In some examples, aspects of the operations of 1920 may be performed by a power control component as described with reference to FIGS. 8 through 11.

At 1925, the UE may determine respective transmit powers for each transmission occasion of the set of transmission occasions based on the power boost configuration. The operations of 1925 may be performed according to the methods described herein. In some examples, aspects of the operations of 1925 may be performed by a transmit power component as described with reference to FIGS. 8 through 11.

At 1930, the UE may transmit the one or more uplink messages via the set of transmission occasions in accordance with the respective transmit powers. The operations of 1930 may be performed according to the methods described herein. In some examples, aspects of the operations of 1930 may be performed by an uplink transmitter as described with reference to FIGS. 8 through 11.

Figure 20:
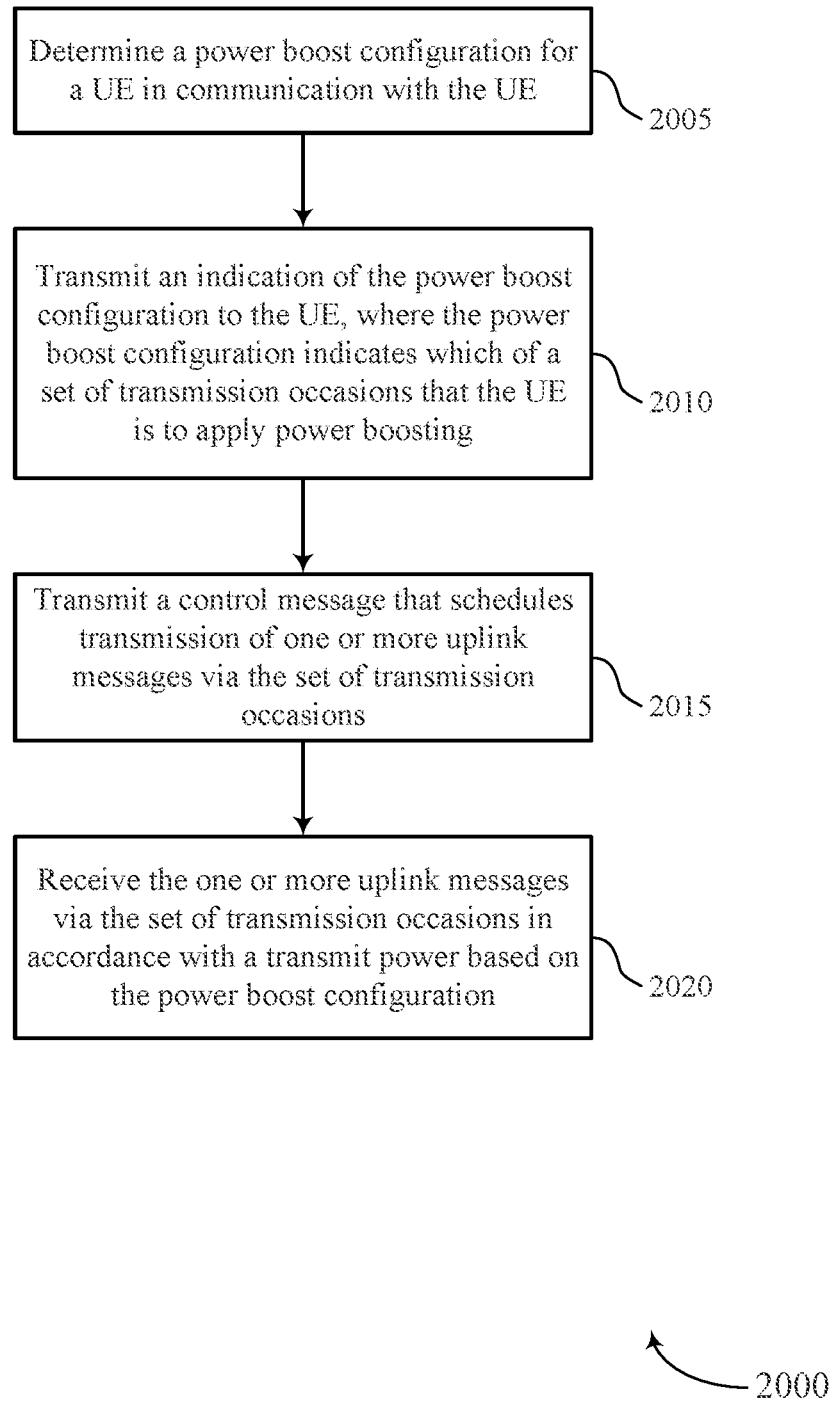

FIG. 20 shows a flowchart illustrating a method 2000 that supports power boosting for uplink shared channel repetitions in accordance with aspects of the present disclosure. The operations of method 2000 may be implemented by a base station 105 or its components as described herein. For example, the operations of method 2000 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 2005, the base station may determine a power boost configuration for a UE in communication with the UE. The operations of 2005 may be performed according to the methods described herein. In some examples, aspects of the operations of 2005 may be performed by a configuration manager as described with reference to FIGS. 12 through 15.

At 2010, the base station may transmit an indication of the power boost configuration to the UE, where the power boost configuration indicates which of a set of transmission occasions that the UE is to apply power boosting. The operations of 2010 may be performed according to the methods described herein. In some examples, aspects of the operations of 2010 may be performed by a configuration transmitter as described with reference to FIGS. 12 through 15.

At 2015, the base station may transmit a control message that schedules transmission of one or more uplink messages via the set of transmission occasions. The operations of 2015 may be performed according to the methods described herein. In some examples, aspects of the operations of 2015 may be performed by a control transmitter as described with reference to FIGS. 12 through 15.

At 2020, the base station may receive the one or more uplink messages via the set of transmission occasions in accordance with a transmit power based on the power boost configuration. The operations of 2020 may be performed according to the methods described herein. In some examples, aspects of the operations of 2020 may be performed by an uplink receiver as described with reference to FIGS. 12 through 15.

Figure 21:
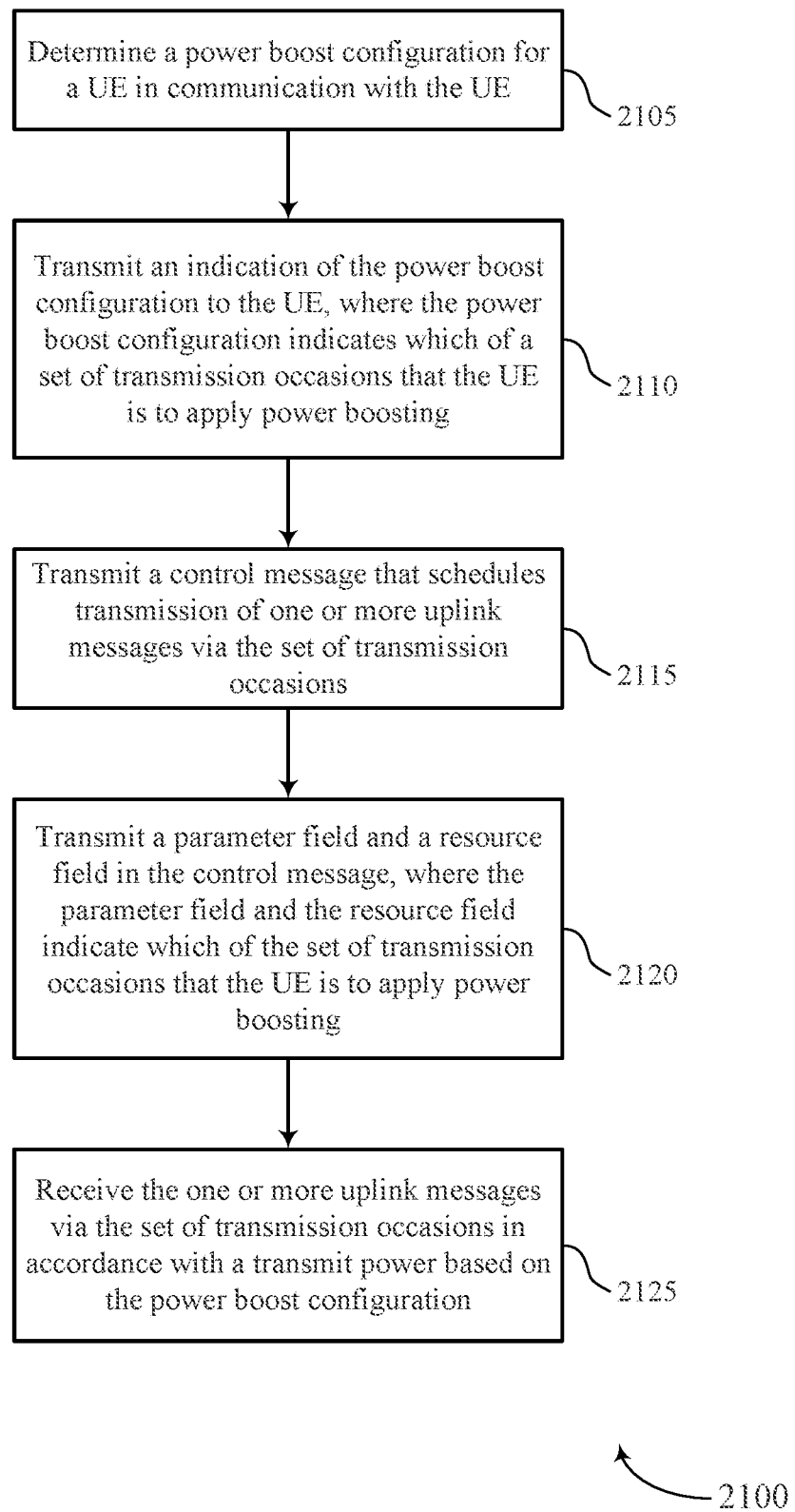

FIG. 21 shows a flowchart illustrating a method 2100 that supports power boosting for uplink shared channel repetitions in accordance with aspects of the present disclosure. The operations of method 2100 may be implemented by a base station 105 or its components as described herein. For example, the operations of method 2100 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 2105, the base station may determine a power boost configuration for a UE in communication with the UE. The operations of 2105 may be performed according to the methods described herein. In some examples, aspects of the operations of 2105 may be performed by a configuration manager as described with reference to FIGS. 12 through 15.

At 2110, the base station may transmit an indication of the power boost configuration to the UE, where the power boost configuration indicates which of a set of transmission occasions that the UE is to apply power boosting. The operations of 2110 may be performed according to the methods described herein. In some examples, aspects of the operations of 2110 may be performed by a configuration transmitter as described with reference to FIGS. 12 through 15.

At 2115, the base station may transmit a control message that schedules transmission of one or more uplink messages via the set of transmission occasions. The operations of 2115 may be performed according to the methods described herein. In some examples, aspects of the operations of 2115 may be performed by a control transmitter as described with reference to FIGS. 12 through 15.

At 2120, the base station may transmit a parameter field and a resource field in the control message, where the parameter field and the resource field indicate which of the set of transmission occasions that the UE is to apply power boosting. The operations of 2120 may be performed according to the methods described herein. In some examples, aspects of the operations of 2120 may be performed by a field manager as described with reference to FIGS. 12 through 15.

At 2125, the base station may receive the one or more uplink messages via the set of transmission occasions in accordance with a transmit power based on the power boost configuration. The operations of 2125 may be performed according to the methods described herein. In some examples, aspects of the operations of 2125 may be performed by an uplink receiver as described with reference to FIGS. 12 through 15.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
    receiving, from a base station, a control message that schedules a set of transmission occasions for one or more uplink messages for the UE;
    determining a power boost configuration for the UE, the power boost configuration indicating which of the set of transmission occasions to apply power boosting; and
    transmitting the one or more uplink messages via the set of transmission occasions in accordance with respective transmit powers, wherein the respective transmit powers for each transmission occasion of the set of transmission occasions are based at least in part on the power boost configuration.

2. The method of claim 1, wherein determining the power boost configuration comprises:
    determining the power boost configuration based at least in part on the control message, wherein the control message comprises a field that indicates which of the set of transmission occasions to apply power boosting.

3. The method of claim 2, wherein the field indicates that power boosting is to be applied to both a first subset of the set of transmission occasions and a second subset of the set of transmission occasions, the method further comprising:
    determining a first set of uplink power control parameters for the first subset of the set of transmission occasions based at least in part on a first parameter field in the control message; and
    determining a second set of uplink power control parameters for the second subset of the set of transmission occasions based at least in part on a second parameter field in the control message.

4. The method of claim 1, further comprising:
    determining a first set of uplink power control parameters for a first subset of the set of transmission occasions based at least in part on a first set of bits of a parameter field in the control message; and
    determining a second set of uplink power control parameters for a second subset of the set of transmission occasions based at least in part on a second set of bits of the parameter field in the control message.

5. The method of claim 1, further comprising:
    determining a first set of uplink power control parameters for a first subset of the set of transmission occasions based at least in part on a first parameter field and a first resource field included in the control message, wherein the first resource field corresponds to the first subset of the set of transmission occasions.

6. The method of claim 5, further comprising:
    determining a second set of uplink power control parameters for a second subset of the set of transmission occasions based at least in part on a second parameter field and a second resource field included in the control message, wherein the second resource field corresponds to the second subset of the set of transmission occasions.

7. The method of claim 6, further comprising:
    receiving a second control message before receiving the control message, wherein the second control message indicates a presence of the second parameter field.

8. The method of claim 1, further comprising:
determining a first open loop power control parameter for a first subset of the set of transmission occasions based at least in part on the control message comprising a joint parameter field and a joint resource field indicating a first value of a pair of values for open loop power control for the first subset of the set of transmission occasions; and
determining a second open loop power control parameter for a second subset of the set of transmission occasions based at least in part on the control message comprising the joint parameter field and the joint resource field indicating a second value of the pair of values for open loop power control for the second subset of the set of transmission occasions.

9. The method of claim 1, further comprising:
receiving a second control message before receiving the control message, wherein the second control message comprises the power boost configuration indicating which of the set of transmission occasions to apply power boosting.

10. The method of claim 9, further comprising:
receiving the second control message via radio resource control (RRC) signaling.

11. The method of claim 1, further comprising:
determining a first set of uplink power control parameters for a first subset of the set of transmission occasions based at least in part on the power boost configuration;
determining a second set of uplink power control parameters for a second subset of the set of transmission occasions based at least in part on the power boost configuration;
transmitting a first uplink message via the first subset of the set of transmission occasions based at least in part on the first set of uplink power control parameters; and
transmitting a second uplink message via the second subset of the set of transmission occasions based at least in part on the second set of uplink power control parameters.

12. The method of claim 1, wherein determining respective transmit powers comprises:
determining a first transmit power for a first subset of the set of transmission occasions based at least in part on the power boost configuration; and
determining a second transmit power for a second subset of the set of transmission occasions based at least in part on the power boost configuration.

13. The method of claim 12, further comprising:
determining the first and second transmit powers to be the same based at least in part on the power boost configuration indicating both the first and second subsets of the set of transmission occasions for applying power boosting.

14. A method for wireless communications at a base station, comprising:
determining a power boost configuration for a user equipment (UE) in communication with the UE;
transmitting an indication of the power boost configuration to the UE, wherein the power boost configuration indicates which of a set of transmission occasions that the UE is to apply power boosting;
transmitting a control message that schedules transmission of one or more uplink messages via the set of transmission occasions; and
receiving the one or more uplink messages via the set of transmission occasions in accordance with a transmit power based at least in part on the power boost configuration.

15. The method of claim 14, wherein transmitting the indication of the power boost configuration comprises:
including the indication of the power boost configuration in the control message that schedules transmission of one or more uplink messages, wherein the control message comprises downlink control information (DCI).

16. The method of claim 14, wherein transmitting the indication of the power boost configuration comprises:
transmitting, via radio resource control (RRC) signaling, a second control message comprising the indication of the power boost configuration.

17. The method of claim 14, further comprising:
transmitting a parameter field and a resource field in the control message, wherein the parameter field and the resource field indicate which of the set of transmission occasions that the UE is to apply power boosting.

18. An apparatus for wireless communications at a user equipment (UE), comprising:
a processor, memory coupled with the processor; and
instructions stored in the memory and executable by the processor to cause the apparatus to:
receive, from a base station, a control message that schedules a set of transmission occasions for one or more uplink messages for the UE;
determine a power boost configuration for the UE, the power boost configuration indicating which of the set of transmission occasions to apply power boosting; and
transmit the one or more uplink messages via the set of transmission occasions in accordance with respective transmit powers, wherein the respective transmit powers for each transmission occasion of the set of transmission occasions are based at least in part on the power boost configuration.

19. The apparatus of claim 18, wherein the instructions to determine the power boost configuration are executable by the processor to cause the apparatus to:
determine the power boost configuration based at least in part on the control message, wherein the control message comprises a field that indicates which of the set of transmission occasions to apply power boosting.

20. The apparatus of claim 19, wherein the field indicates that power boosting is to be applied to both a first subset of the set of transmission occasions and a second subset of the set of transmission occasions, and the instructions are further executable by the processor to cause the apparatus to:
determine a first set of uplink power control parameters for the first subset of the set of transmission occasions based at least in part on a first parameter field in the control message; and
determine a second set of uplink power control parameters for the second subset of the set of transmission occasions based at least in part on a second parameter field in the control message.

21. The apparatus of claim 18, wherein the instructions are further executable by the processor to cause the apparatus to:
determine a first set of uplink power control parameters for a first subset of the set of transmission occasions based at least in part on a first set of bits of a parameter field in the control message; and determine a second set of uplink power control parameters for a second subset of the set of transmission occasions based at least in part on a second set of bits of the parameter field in the control message.

22. The apparatus of claim 18, wherein the instructions are further executable by the processor to cause the apparatus to:
determine a first set of uplink power control parameters for a first subset of the set of transmission occasions based at least in part on a first parameter field and a first resource field included in the control message, wherein the first resource field corresponds to the first subset of the set of transmission occasions.

23. The apparatus of claim 22, wherein the instructions are further executable by the processor to cause the apparatus to:
determine a second set of uplink power control parameters for a second subset of the set of transmission occasions based at least in part on a second parameter field and a second resource field included in the control message, wherein the second resource field corresponds to the second subset of the set of transmission occasions.

24. The apparatus of claim 18, wherein the instructions are further executable by the processor to cause the apparatus to:
determine a first open loop power control parameter for a first subset of the set of transmission occasions based at least in part on the control message comprising a joint parameter field and a joint resource field indicating a first value of a pair of values for open loop power control for the first subset of the set of transmission occasions; and
determine a second open loop power control parameter for a second subset of the set of transmission occasions based at least in part on the control message comprising the joint parameter field and the joint resource field indicating a second value of the pair of values for open loop power control for the second subset of the set of transmission occasions.

25. The apparatus of claim 18, wherein the instructions are further executable by the processor to cause the apparatus to:
determine a first open loop power control parameter for a first subset of the set of transmission occasions based at least in part on a joint parameter field and an absence of a resource field in the control message; and
determine a second open loop power control parameter for a second subset of the set of transmission occasions based at least in part on the joint parameter field and the absence of the resource field in the control message.

26. The apparatus of claim 18, wherein the instructions are further executable by the processor to cause the apparatus to:
receive a second control message before receiving the control message, wherein the second control message comprises the power boost configuration indicating which of the set of transmission occasions to apply power boosting.

27. The apparatus of claim 26, wherein the instructions are further executable by the processor to cause the apparatus to:
receive the second control message via radio resource control (RRC) signaling.

28. The apparatus of claim 18, wherein the instructions are further executable by the processor to cause the apparatus to:

determine a first set of uplink power control parameters for a first subset of the set of transmission occasions based at least in part on the power boost configuration;
determine a second set of uplink power control parameters for a second subset of the set of transmission occasions based at least in part on the power boost configuration;
transmit a first uplink message via the first subset of the set of transmission occasions based at least in part on the first set of uplink power control parameters; and
transmit a second uplink message via the second subset of the set of transmission occasions based at least in part on the second set of uplink power control parameters.

29. The apparatus of claim 18, wherein the instructions to determine respective transmit powers are executable by the processor to cause the apparatus to:
determine a first transmit power for a first subset of the set of transmission occasions based at least in part on the power boost configuration; and
determine a second transmit power for a second subset of the set of transmission occasions based at least in part on the power boost configuration.

30. The apparatus of claim 29, wherein the instructions are further executable by the processor to cause the apparatus to:
determine the first and second transmit powers to be the same based at least in part on the power boost configuration indicating both the first and second subsets of the set of transmission occasions for applying power boosting.

31. An apparatus for wireless communications at a base station, comprising:
a processor,
memory coupled with the processor; and
instructions stored in the memory and executable by the processor to cause the apparatus to:
determine a power boost configuration for a user equipment (UE) in communication with the UE;
transmit an indication of the power boost configuration to the UE, wherein the power boost configuration indicates which of a set of transmission occasions that the UE is to apply power boosting;
transmit a control message that schedules transmission of one or more uplink messages via the set of transmission occasions; and
receive the one or more uplink messages via the set of transmission occasions in accordance with a transmit power based at least in part on the power boost configuration.

32. The apparatus of claim 31, wherein the instructions to transmit the indication of the power boost configuration are executable by the processor to cause the apparatus to:
include the indication of the power boost configuration in the control message that schedules transmission of one or more uplink messages, wherein the control message comprises downlink control information (DCI).

33. The apparatus of claim 31, wherein the instructions to transmit the indication of the power boost configuration are executable by the processor to cause the apparatus to:
transmit, via radio resource control (RRC) signaling, a second control message comprising the indication of the power boost configuration.

34. The apparatus of claim 31, wherein the instructions are further executable by the processor to cause the apparatus to:
transmit a parameter field and a resource field in the control message, wherein the parameter field and the resource field indicate which of the set of transmission occasions that the UE is to apply power boosting.

35. A non-transitory computer-readable medium storing code for wireless communications at a user equipment (UE), the code comprising instructions executable by a processor to:
  receive, from a base station, a control message that schedules a set of transmission occasions for one or more uplink messages for the UE;
  determine a power boost configuration for the UE, the power boost configuration indicating which of the set of transmission occasions to apply power boosting;
  determine respective transmit powers for each transmission occasion of the set of transmission occasions based at least in part on the power boost configuration; and
  transmit the one or more uplink messages via the set of transmission occasions in accordance with the respective transmit powers.

\* \* \* \* \*